United States Patent
Szita

(10) Patent No.: US 6,785,084 B2
(45) Date of Patent: Aug. 31, 2004

(54) CORRECTION OF DYNAMIC TRACK SPACING ERRORS IN STORAGE DEVICES

(75) Inventor: Gabor Szita, Newark, CA (US)

(73) Assignee: Seagate Technology LLC, Scotts Valley, CA (US)

(*) Notice: Subject to any disclaimer, the term of this patent is extended or adjusted under 35 U.S.C. 154(b) by 354 days.

(21) Appl. No.: 09/895,754

(22) Filed: Jun. 29, 2001

(65) Prior Publication Data

US 2002/0067567 A1 Jun. 6, 2002

Related U.S. Application Data

(60) Provisional application No. 60/242,781, filed on Oct. 24, 2000.

(51) Int. Cl.$^7$ .............................................. G11B 5/596
(52) U.S. Cl. ................................ 360/77.04; 360/77.08
(58) Field of Search ........................................ 360/77.04

(56) References Cited

U.S. PATENT DOCUMENTS

| | | | |
|---|---|---|---|
| 4,939,599 A | | 7/1990 | Chainer et al. |
| 5,581,420 A | | 12/1996 | Chainer et al. |
| 5,793,554 A | | 8/1998 | Chainer et al. |
| 5,835,300 A | | 11/1998 | Murphy et al. |
| 5,844,742 A | | 12/1998 | Yarmchuk et al. |
| 5,867,343 A | * | 2/1999 | Le et al. ................... 360/77.08 |
| 5,875,064 A | | 2/1999 | Chainer et al. |
| 5,901,003 A | | 5/1999 | Chainer et al. |
| 5,926,338 A | | 7/1999 | Jeon et al. |
| 6,005,751 A | | 12/1999 | Kazmierczak et al. |
| 6,031,680 A | | 2/2000 | Chainer et al. |
| 6,101,058 A | | 8/2000 | Morris |
| 6,115,203 A | | 9/2000 | Ho et al. |
| 6,141,175 A | | 10/2000 | Nazarian et al. |
| 6,469,859 B1 | * | 10/2002 | Chainer et al. ................ 360/75 |
| 6,496,322 B1 | * | 12/2002 | Hasegawa et al. ....... 360/77.08 |

* cited by examiner

Primary Examiner—David Hudspeth
Assistant Examiner—Mitchell Slavitt
(74) Attorney, Agent, or Firm—David K. Lucente; Derek J. Berger

(57) ABSTRACT

The present invention offers a time efficient means to determine and eliminate dynamic track squeeze error. The present invention can be used to correct imperfections in tracks written by a conventional servowriter or using self-propagating servo writing. The dynamic track squeeze is determined within a single disc revolution. The read head is positioned half way between two servo tracks. Positioning information for track following is obtained from either track as one disc revolution is completed. During the disc revolution, position measurement is simultaneously collected from both tracks. The difference between the position measurements from each track, which represents the dynamic track squeeze between the two tracks, is determined. An appropriate ZAP correction factor is determined and written to the servo sector of the desired track. The ZAP correction factor is input to the disc drive servo controller and eliminates the dynamic track squeeze.

27 Claims, 11 Drawing Sheets

CORRECTION OF DYNAMIC TRACK SPACING ERRORS IN STORAGE DEVICES

RELATED APPLICATIONS

This application claims priority of U.S. provisional application Serial No. 60/242,781, filed Oct. 24, 2000. This application is also related to co-pending, commonly-assigned United States utility patent applications as follows: Ser. No. 09/242,574 filed Feb. 3, 1999; Ser. No. 09/474,277 filed Dec. 29, 1999; Ser. No. 09/489,532 filed Jan. 21, 2000; Ser. No. 09/697,002 filed Oct. 26, 2000; Ser. No. 09/774,134 filed Jan. 30, 2001; and Ser. No. 09/596,491 by Qiang Bi et al., filed Jun. 29, 2001.

FIELD OF THE INVENTION

This application relates generally to disc drive data storage devices and more particularly to an apparatus and method of compensating for track spacing errors.

BACKGROUND OF THE INVENTION

Disc drives are the most common means of storing electronic information in use today. Typical disc drives have one or more magnetic media discs attached to a spindle; the spindle and discs are rotated at a constant velocity by a spindle motor. An actuator assembly, attached to a bearing shaft assembly next to the discs, radially traverses over the surface of the discs. The actuator assembly has a plurality of actuator arms, each with one or more flexures extending from the end of each actuator arm. A read/write head is attached to the distal end of each flexure. The actuator assembly is rotated about the bearing shaft assembly by a servo positioner. The servo positioner receives signals from a controller, rotates the actuator assembly, and positions the read/write head relative to the disc surface.

Information is transferred to and from the discs by the read/write heads attached to the flexures at the end of the actuator arms. Each head includes an air bearing slider that enables the head to fly on a cushion of air in close proximity to the corresponding surface of the associated disc. Most heads have a write element and a read element. The write element is used to store information to the disc, whereas the read element is used to retrieve information from the disc.

Discs, to facilitate information storage and retrieval, are radially divided into concentric circles known as "servo tracks" or "tracks". Tracks are given a track number, among other identifying information, so that the servo positioner can align the read/write head over desired track. Information is stored or retrieved from the disc after the read/write head is aligned over the desired track. The process of switching between different tracks is called "seeking", whereas remaining over a single track while information is stored or retrieved is called "following".

Each track is linearly subdivided into "segments" or "sectors". The two most common types of sectors are informational data sectors and servo data sectors. In a typical disc drive, the informational data sectors usually contain information generated or stored by the user such as programs files, application files, or database files. There may be ten to a hundred, or even more, informational data sectors dispersed around a single track.

The servo sectors, on the other hand, contain information that is used by the servo positioner to determine the radial, and linear, position of the head relative to the disc surface and relative to a track center. Servo sectors typically consist of a Gray code field, which provides coarse position information to the servo positioner such as the track and cylinder number, and a servo burst field, which provides fine position information to the servo positioner such as the relative position of the head to the track center. Generally speaking, the burst field creates a specific magnitude signal on one side of the track centerline and a different specific magnitude signal on the other side of the track centerline. The read head can be aligned directly over a track centerline by positioning the read head at the "null" position, or the position in which the sum of the burst field magnitudes cancel each other and equal zero.

Servo sectors are usually embedded between adjacent informational data sectors located on a single track. The servo sector provides positional information to the servo positioner so that the read/write head can be properly aligned over the subsequent informational sector. A clock signal mechanism is used to insure that data intended to be stored in a servo sector does not overwrite data in an information sector (and vice versa).

The number of tracks located within a specific area of the disc is called the "track density". The greater the number of tracks per area, the greater the track density. The track density may vary as the disc is radially traversed. Disc manufacturers attempt to increase track density in order to place more information on a constant size disc. Track density may be increased by either decreasing the track width or by decreasing the space between adjacent tracks.

An increase in track density necessitates increased positioning accuracy of the read/write elements in order to prevent data from being read from or written to the wrong track. Manufacturers attempt to fly the read/write head elements directly over the center of the desired track when the read/write operation occurs to insure that the information is being read from and written to the correct track. Hitting the track center target at high track densities requires that the tracks be as close to perfectly circular as possible when written to the disc surface.

Tracks are usually written on the disc during disc drive manufacturing using one of two means: 1) a servowriting machine, or 2) self-propagated servo writing. A servowriting machine is a large piece of external equipment that writes servo tracks on a disc drive. A typical servowriting machine uses a large actuator with laser interferometer position feedback and a pushpin to position the arm of the disk drive. The write element, which is attached to the arm, is aligned to where the desired track is to be written on the disc surface. A track is written on the disc once the write element is correctly aligned. The head/arm positioner then moves the write element a predetermined distance to the next desired track location. The head/arm positioner, therefore, controls both the track placement and track-to-track spacing.

Although accurate, a servowriter has several drawbacks. First, a typical disc may contain more than 60,000 servo tracks. The process of aligning and writing each track on the disc is very time consuming and expensive. Next, although very accurate at lower track densities, the servowriter cannot meet the accuracy requirements dictated by higher track densities. Finally, track spacing and track shape errors, caused by spindle wobble, vibrations, disc slip, and thermal expansion among others, are introduced during the servowriting process.

The second means of writing tracks on a disc is called self-propagating servo writing. Oliver et al first described this method of servo track writing in U.S. Pat. No. 4,414,589. Several other patents have disclosed slight variations in the Oliver patent, but the same basic approach is used. Under the basic method, the drive's actuator assembly is positioned at one of its travel-range-limit stops. A first reference track is written with the write head element. The first reference track is then read with the read element as the head is radially displaced from the first reference track. When a distance is reached such that the read element senses a predetermined percentage of the first reference track's amplitude, a second reference track is written. The predetermined percentage is called the "reduction number".

For example, the read element senses 100% of the first reference track's amplitude when the read element is directly over the first reference track. If the reduction number is 40%, the head is radially displaced from the first reference track until the read element senses only 40% of the first reference track's amplitude. A second reference pattern is written to the disc once the 40% is sensed by the read element. The head is then displaced in the same direction until the read head senses 40% of the second reference track's amplitude. A third reference track is then written and the process continues. The process ends when the actuator arm's second travel-range-limit stop is reached and the entire disc surface is filled with reference tracks. The average track density is then calculated using the number of tracks written and the length of travel of the head.

If the average track density is too high, the disc is erased, the reduction number is lowered so that a larger displacement occurs between tracks, and the process is repeated. If the track density is too low, the disc is erased, the reduction number is increased so that a smaller displacement occurs between tracks, and the process is repeated. If the track density is within the desired range, the reduction number for the desired average track density has been determined, the disc is erased, and servo tracks are written to the disc by alternatively writing servo and reference tracks. The servo tracks are further divided by alternatively writing servo and informational sectors.

A well-known problem with self-propagating servo writing is called "radial error propagation". The servo system, when writing a new track during self-propagating servo writing, obtains position information by monitoring the signal generated in the read head by the previous track's servo information. The servo system "follows" the path of the previous track, and therefore, the track being written inherits any imperfections (caused by spindle wobble, disc slip, changing head fly height, and thermal expansion among others) in the track being followed. The imperfections of the followed track may even be amplified within the written track if, for example, the closed loop gain of the servo positioner is larger than unity at certain frequencies.

Ideally, tracks are perfectly circular and spaced at a specific distance from each other. The imperfections in track shape and track spacing result in "track squeeze". The non-parallelism of two adjacent tracks is referred to as dynamic or AC track squeeze, whereas track spacing imperfections are referred to as static or DC track squeeze. AC track squeeze refers to the situation in which two adjacent tracks have shape imperfections at different locations around their individual circumferences. The two tracks may be too close together at some points and too far apart at other points.

DC track squeeze, on the other hand, refers to the situation in which the average centers of two adjacent tracks are either closer or farther apart than a nominal distance. In other words, the spacing between the two tracks is incorrect even though the two tracks are perfectly circular. The term "track squeeze" is often used to generally refer to the combination of AC and DC track squeeze. Furthermore, the track-to-track variation of track shape is called the "relative track shape error", whereas the deviation of the track shape from a perfect circle is called "absolute track shape error". The prior art methods of machine servo writing and self-propagated servo writing cannot achieve the accuracy needed for higher track densities because of inherent limitations in controlling track squeeze, relative track shape error, and absolute track shape error.

Yarmchuk et al in U.S. Pat. No. 5,659,436 extensively studied radial error propagation. Yarmchuk proposed that indefinite growth of written in errors are avoided by insuring that the propagation gain is less than unity at all frequencies. Yarmchuk proposed that the gain could be maintained at a value less than unity at all frequencies by carefully choosing the open loop transfer function and/or providing an appropriate reference correction table derived from the position error signal during the write revolution of the previous track. However, the method proposed by Yarmchuk fails to discuss the influence of measurement noise and requires complicated calculations for implementation.

The Yarmchuk method contains an additional drawback. Yarmchuk allows relatively large absolute track shape inaccuracy (i.e., the deviation of the track shape from a perfect circle). In effect, the accuracy obtained by the Yarmchuk method is equal to the track following accuracy of the disc drive, typically about 10%.

Zero Acceleration Path ("ZAP") correction is another approach created to eliminate radial error propagation. The basic idea of ZAP correction is to add appropriate correction factors to the measured head position at each servo sector. The correction factors cancel all written in track shape errors, thereby improving the shape of the modified track. The correction factors are typically determined during or after the servo track writing process. The correction factors are then written back onto the discs; usually each servo sector has a dedicated field for storing the correction factors.

A prior art method of determining ZAP correction factors is called "inverse transformation". Inverse transformation guarantees that track squeeze is minimized and that the tracks are circular. In other words, the inverse transformation method guarantees that the relative track shape error (the track-to-track variation) remains small, and that the absolute track shape error (the deviation of the tracks from a perfect circle) also remains small as the self-servo track writing propagates. The major disadvantage of using inverse transformation is that several disc revolutions are required to accurately determine the correction factors. Typically more than eight revolutions are necessary to achieve acceptable accuracy in today's disc drives.

An increase in track density requires an increase in the accuracy of the ZAP correction factors. Doubling the track density, for example, requires doubling the accuracy of the ZAP correction factors. The number of averaging revolutions must be four times higher to double the accuracy of the ZAP correction factors. Therefore, the total servo writing time will be eight times higher if track density is doubled because twice as many tracks (requiring four times the revolutions for accurate ZAP correction factors) are present on the disc. Each revolution increases the time and cost of servowriting.

A second method of determining ZAP correction factors, called "recursive estimation", was introduced to shorten the amount of time required to correct for track spacing errors. Recursive estimation guarantees that AC track squeeze is minimized, but it does not guarantee an improvement in DC track squeeze. In other words, the recursive estimation method guarantees that the relative track shape error (the track-to-track variation) remains small, but recursive estimation does not guarantee that the absolute track shape error (the deviation of the tracks from a perfect circle) remains small as self-servo track writing propagates.

The "recursive estimation" ZAP method is combined with the "inverse transformation" ZAP method to overcome the limitations of both methods. A combination of recursive estimation and inverse transformation provides small absolute track shape error and small relative track shape error. Furthermore, a combination of recursive estimation and inverse transformation reduces the number of disc revolutions necessary to determine the ZAP correction factors for each track.

However, the prior art method of recursive estimation does not guarantee small AC track spacing errors if the offset between the read and write head is larger than a few servo track. Furthermore, the prior art method of recursive estimation could only be used during self-propagating servo writing; tracks written by a conventional servowriter could not be corrected by the prior art method of recursive estimation.

Accordingly there is a need for an apparatus and a method of eliminating the track shape errors that occur during self-propagated and conventional servo track writing that overcome the limitations of prior art approaches.

SUMMARY OF THE INVENTION

Against this backdrop, an embodiment of the present invention offers a time efficient means to determine and eliminate dynamic track squeeze error. The embodiment of the present invention can be used to correct imperfections in tracks written by a conventional servowriter or in tracks written using self-propagating servo writing. The embodiment of the present invention can be used for various types of storage systems such as magnetic and optical disc drives among others, however, a magnetic disc drive has been used to illustrate the present invention.

Accordingly, a preferred embodiment of the present invention relates to a method of determining dynamic track squeeze error within a single disc revolution. After a servo track is written, the read element is positioned half way between two servo tracks (i.e., half way between the AB null position and the CD null position in a quadrature burst pattern). Positioning information for track following is obtained from either the AB or the CD null set as one disc revolution is completed. During the disc revolution, position measurements are also simultaneously collected from both the AB null and the CD null. The difference between the position measurement from the AB null and the position measurement from the CD null is determined. The difference represents the non-parallelism, or dynamic track squeeze, between the two adjacent tracks.

A preferred embodiment further relates to a method of eliminating dynamic track squeeze error within a single disc revolution. After a servo track is written, the read head is positioned half way between two servo tracks (i.e., half way between the AB null position and the CD null position in a quadrature burst pattern). Positioning information for track following is obtained from either the AB or the CD null set as one disc revolution is completed. During the disc revolution, position measurements are also simultaneously collected from both the AB null and the CD null. The difference between the position measurement from the AB null and the position measurement from the CD null is determined. The difference represents the non-parallelism, or dynamic track squeeze, between the two adjacent tracks caused by track shape imperfections. An appropriate zero acceleration path ("ZAP") correction factor is determined and written to the servo sector of one of the tracks. The ZAP correction factor is input to the disc drive servo controller to eliminate track shape imperfections and dynamic track squeeze.

Furthermore, a preferred embodiment of the present invention relates to an apparatus for eliminating dynamic track squeeze error within a single disc revolution. The apparatus includes a servo positioner and controller for aligning the read element half way between two adjacent servo tracks (i.e., half way between the AB null position and the CD null position in a quadrature burst pattern). The servo positioner obtains positioning information for track following from either the AB or the CD null set as one disc revolution is completed. During the disc revolution, the controller simultaneously collects position measurements from both the AB null and the CD null sets. The controller determines the difference between the position measurement from the AB null set and the position measurement from the CD null set. The difference represents the non-parallelism, or dynamic track squeeze, between the two adjacent tracks. The controller of the apparatus determines and writes an appropriate ZAP correction factor to the servo sector of one of the tracks to eliminate track shape imperfections and dynamic track squeeze.

The preferred embodiment of the present invention requires only one disc revolution to determine the appropriate ZAP correction factor. Furthermore, the preferred embodiment of the present invention can be used to eliminate track squeeze errors in servo tracks written by a conventional servo-writer or using self-propagated servo writing.

These and various other features as well as additional advantages which characterize the present invention will be apparent from a reading of the following detailed description and a review of the associated drawings.

BRIEF DESCRIPTION OF THE DRAWINGS

FIG. 7 is a graph of relative track shape error (track squeeze) as a function of the weighting actor a.

FIG. 8 is a graph of absolute track shape error (non-circularity) as a function of the weighting factor a.

DETAILED DESCRIPTION

The present invention offers a time efficient means to eliminate dynamic track squeeze errors that occur during conventional and/or self-propagating servowriting. A magnetic disc drive has been used to illustrate a preferred embodiment of the present invention, however, the present invention can be used for various types of storage systems such as magnetic and optical disc drives among others.

Figure 1:
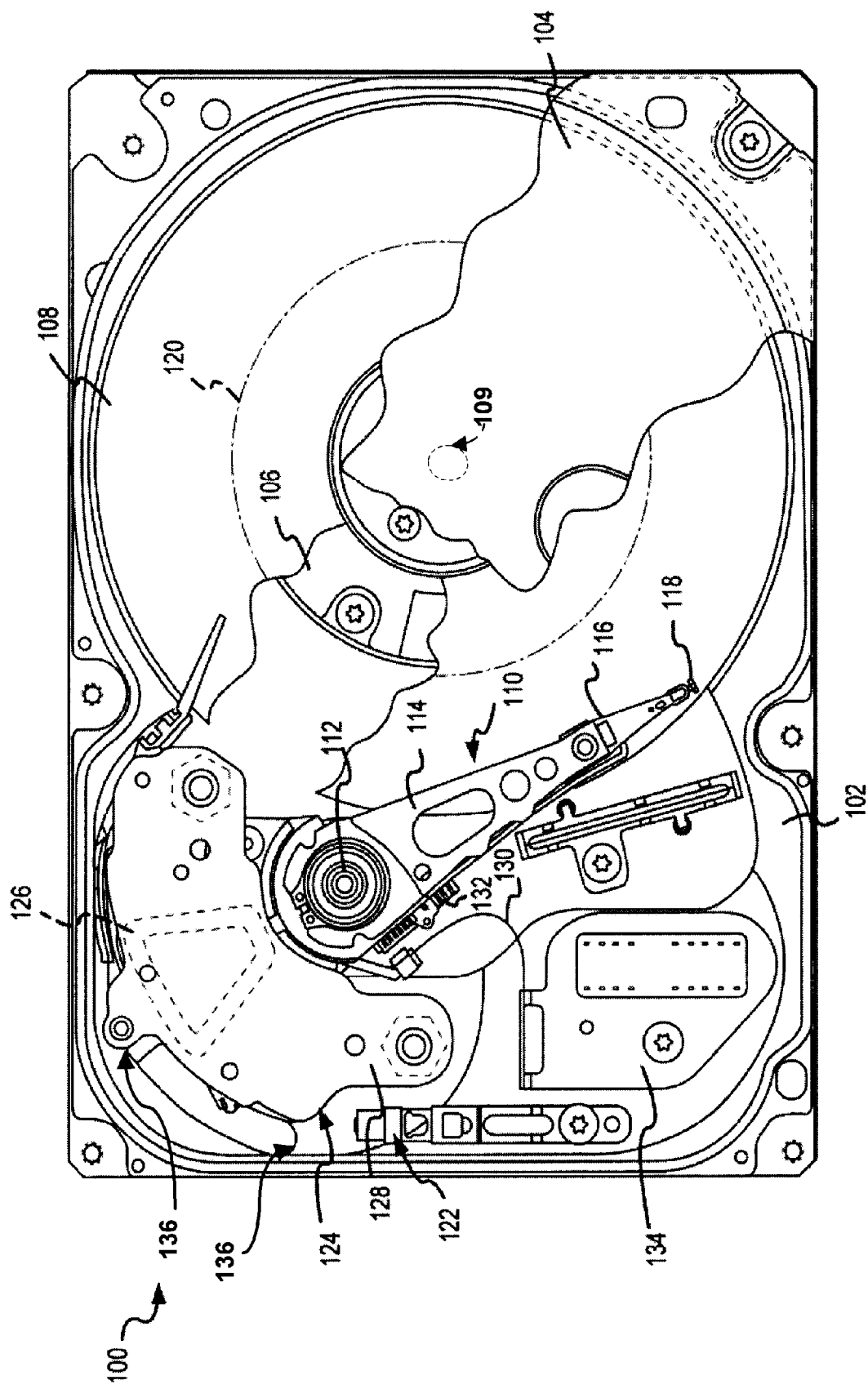
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks 120 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118, which includes an air-bearing slider enabling the transducer head 118 to fly in close proximity above the corresponding surface of the associated disc 108. A read element (not shown) and a write element (not shown) are located on the transducer head 118 and used to retrieve and store information on the disc 108.

During a seek operation, the track 120 position of the transducer heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the transducer heads 118 are caused to move over the surfaces of the discs 108. Travel limit stops 136 establish the transducer heads' 118 range of travel.

The spindle motor 106 is typically de-energized when the disc drive 100 is not in use for extended periods of time. The transducer heads 118 are moved over park zones near the center 109 of the discs 108 when the drive motor is de-energized. The transducer heads 118 are secured over the park zones through the use of an actuator latch arrangement 122, which prevents inadvertent rotation of the actuator assembly 110 when the heads 118 are parked.

A flex assembly 130 provides the requisite electrical connection paths for the actuator assembly 110 while allowing pivotal movement of the actuator assembly 110 during operation. The flex assembly 130 includes a preamplifier 132 to which head wires (not shown) are connected; the head wires, also called head element electrical leads, being routed along the actuator arms 114 and the flexures 116 to the heads 118. The preamplifier 132 amplifies read signals generated by the heads 118 during a read operation. The flex assembly 130 terminates at a flex bracket 134 for communication through the base deck 102 to a disc drive printed circuit board (not shown) mounted to the bottom side of the disc drive 100. The printed circuit board includes a controller (not shown) that is capable of managing read and write operations (among others).

Figure 2:
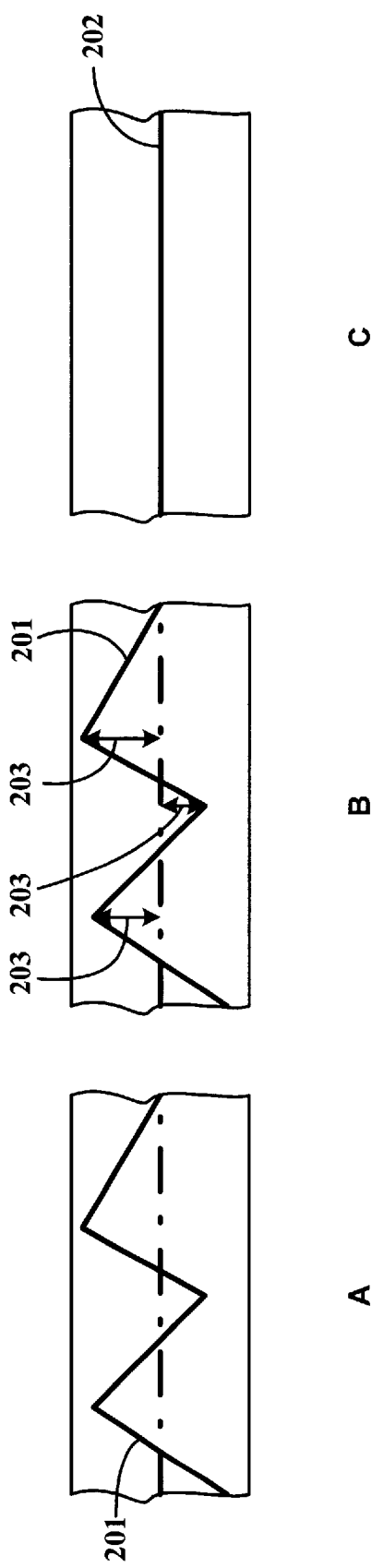
FIG. 2 illustrates the application of Zero Acceleration Path correction factors to a magnified portion of a servo track in accordance with a preferred embodiment of the present invention.

FIG. 2 is an illustration of the zero acceleration path ("ZAP") correction process. A magnified portion of a circular servo track 120, as found on disc 108, is shown in FIG. 2. Ideally, servo track 120 is perfectly circular. Due to inaccuracies in the servo track writing process, however, it is difficult to obtain a perfectly circular servo track 120. Original track center 201 represents the servo track's 120 centerline prior to the application of ZAP correction.

Position A of FIG. 2 illustrates the original servo track center 201 prior to ZAP correction. As shown in position A, original track center 201 is not perfectly circular. As a result, any subsequent servo track 120 that is written to the disc 108 using a lo method of servo track writing that attempts to follow original track center 201 (such as self-propagating servo track writing among others) will contain the same deformation errors as original track center 201. Additionally, the errors in original track center 201 may actually be magnified in some circumstances when writing subsequent servo tracks 120. Furthermore, whether the track shape errors were created by self-propagating or conventional servo writing, it is more difficult for the servo positioner to complete track following operations during normal disc drive 100 operation when deformation errors exist as in original track center 201.

The basic idea behind ZAP correction is to add appropriate correction factors 203 to the measured head 118 position at each servo sector that cancel all written in shape errors of the original track center 201. Position B of FIG. 2 illustrates the addition of the ZAP correction factors 203 to the original track center 201. The ZAP correction factors 203 are subtracted from and/or added to the original track center 201 to cancel the shape errors present in the original track center 201.

Position C of FIG. 2 illustrates the modified track 202 obtained after the addition of the ZAP correction factors 203. The modified track 202 is nearly perfectly circular after the correction factors 203 are added. Any subsequent servo track 120 that is written to disc 108 using a method of servo track writing that attempts to follow modified track center 202 (such as self-propagating servo track writing among others) will not contain the same deformation errors as original track center 201. Instead, the subsequent servo track 120 is nearly perfectly circular. Additionally, the track following capabilities of the servo positioner is greatly improved after ZAP correction factors 203 are applied to the servo sectors.

In a preferred embodiment, the correction factors 203 are determined during the servo writing process and stored in a dedicated field in each servo sector. The ZAP correction factors 203, however, can be stored at another location inside or outside of the disc drive 100. The ZAP correction factors 203 are used to improve self-propagating servo writing results and are also used during normal disc drive 100 operation to cancel any repeatable disturbances, such as track shape irregularity among others, thereby allowing the servo positioner to more easily complete track following tasks.

Figure 3:
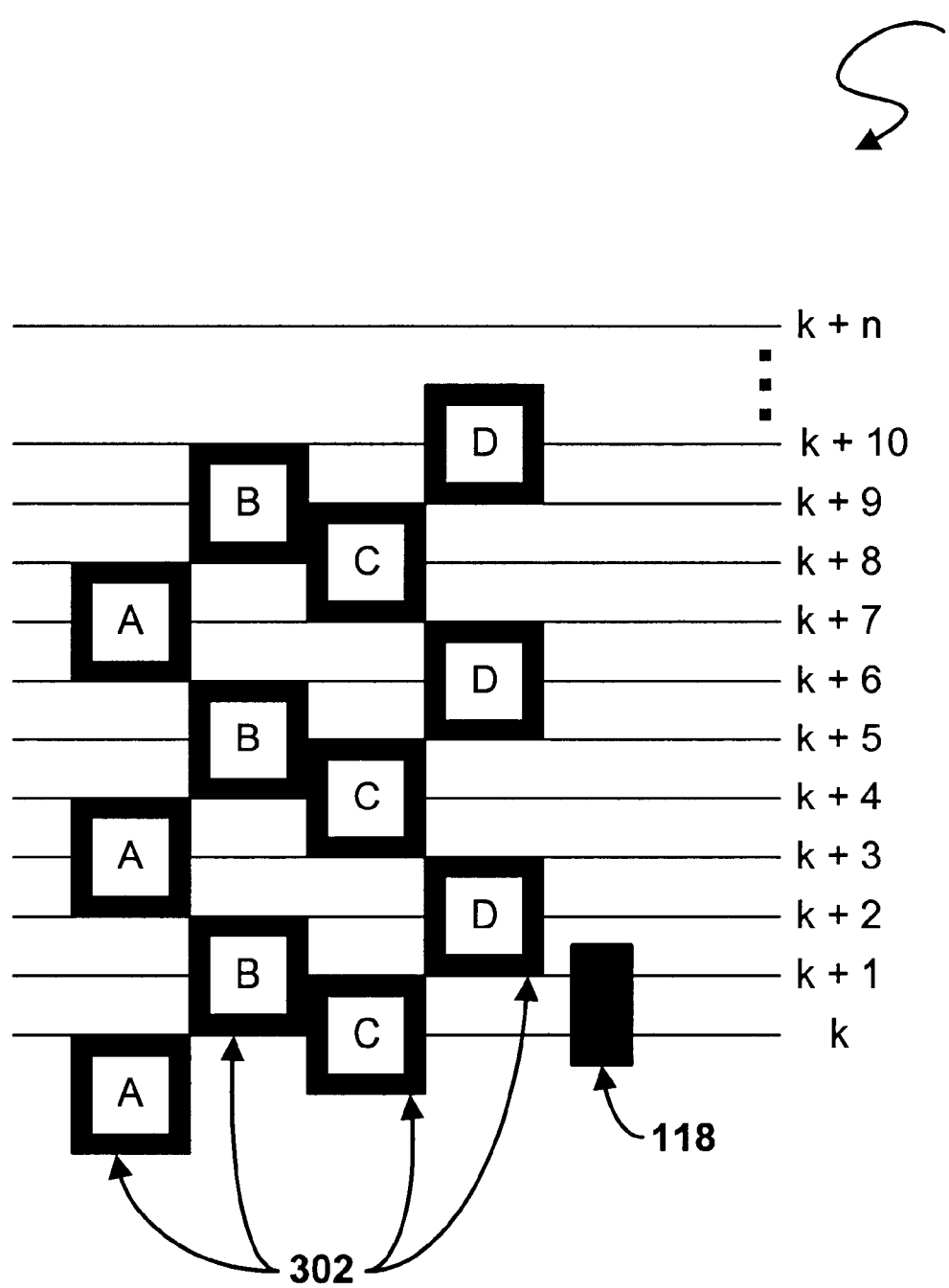
FIG. 3 is an illustration of an ABCD (quadrature) split burst servo pattern.

FIG. 3 illustrates a typical servo burst pattern 300 used to determine the position of the head 118 relative to a track center (i.e., k, k+1, . . . k+n). In a typical disk drive 100, servo burst pattern 300 is located within a track servo sector. A servo sector typically consists of a Gray code field to provide coarse position information (e.g., track number among others) and a servo burst field to provide fine position information. A typical burst pattern 300 consists of one or more bursts, or transitions, 302 that generate a signal in the head's 118 read element. The most typical servo burst arrangement 300, as shown in FIG. 3, is usually referred to as quadrature (or "ABCD") burst pattern 300. The position of the head 118 can be determined accurately by measuring the magnitude of the signal generated by the bursts 302 as the head 118 travels through the burst pattern 300. The burst pattern 300 is decoded to determine the position of the head 118 relative to a track center (i.e., k, k+1, . . . k+n). The quadrature split burst servo pattern 300 is used to illustrate the preferred embodiment of the present invention, however, the present invention can be extended to other servo patterns such as null-pattern among others.

The dynamic track spacing error is the variation of distance between two adjacent tracks 120. Assuming that $y_{(k)}$ denotes the shape of track k and $y_{(k+1)}$ denotes the shape of track k+1, the dynamic track spacing error can be expressed as:

$$s_{(k)} = y_{(k+1)} - y_{(k)}$$

The head 118 is positioned, as shown in FIG. 3, such that the read element is half way between track k and track k+1 to measure the dynamic track spacing between the two tracks. The head 118, at this position, overlaps both the AB and the CD transitions 302. Position information is obtained from either the AB burst pair or the CD burst pair. Once aligned half way between tracks k and track k+1, the position of the read element is simultaneously measured and collected for one disc 108 revolution from both burst 302 pairs as follows:

$$y_{m(k)} = -f_{AB}\left(\frac{A-B}{A+B}\right) \quad (1)$$

$$y_{m(k+1)} = -f_{CD}\left(\frac{C-D}{C+D}\right) + 1 \quad (2)$$

where A, B, C and D represent the magnitude of the signal generated in the read element by the corresponding servo bursts 302. The typically non-linear functions, $f_{AB}(.)$ and $f_{CD}(.)$ map the normalized position information obtained from the AB and CD burst pairs to physical distance from the corresponding track centers. Approaches to determine $f_{AB}(.)$ and $f_{CD}(.)$ are widely discussed in the literature, and are well known to those skilled in the art of disk drive servo systems.

The normalization factors in the denominators of Eq. 1 and Eq. 2 depend on the servo pattern 300, however, the application of this invention is not limited to the classical normalization factors shown here. For example, in certain applications it may be preferable to use A+B+C+D as the normalization factor. In other embodiments, an extra servo burst 302 may be added to the servo pattern 300 and the magnitude of this burst 302 may be used as the normalization factor.

The position measurements $y_{m(k)}$ and $y_{m(k+1)}$ can be expressed as follows:

$$y_{m(k)} = -y_{(k)} + y_d + m' \quad (3)$$

$$y_{m(k+1)} = -y_{(k+1)} + y_d + m'' \quad (4)$$

where $y_{(k)}$ denotes the absolute track shape error of track k, $y_{(k+1)}$ denotes the absolute track shape error of track k+1, $y_d$ denotes the relative motion of the disk 108 and head 118 that occurred during the revolution, and m' and m'' denote the measurement errors. Subtracting equation (4) from equation (3) we get:

$$\hat{s}_{(k)} = y_{m(k)} - y_{m(k+1)} = y_{(k+1)} - y_k + m' - m'' \quad (5)$$

The measurement noise is combined to a single signal $m_{(k)} = m' - m''$ to simplify notations. Equation 5 is then rewritten as:

$$\hat{s}_{(k)} = y_{m(k)} = -y_{m(k+1)} = y_{(k+1)} - y_{(k)} + m_{(k)} \quad (6)$$

The measurement noise, in a typical disk drive 100, is small. Eq. 5, therefore, can be approximated as:

$$\hat{s}_{(k)} = y_{m(k)} - y_{m(k+1)} \approx y_{(k+1)} - y_{(k)} = s_{(k)} \quad (7)$$

Thus, $\hat{s}_{(k)}$ is a vector whose length is equal to the number of servo sectors on the disc 108. Each element of the vector $\hat{s}_{(k)}$ is an estimate of track spacing between track k and track k+1. In many cases, $\hat{s}_{(k)}$ has a non-zero mean value due to static track spacing error, various electrical offsets, head anti-symmetry and non-linearity among others. It is desirable to remove the DC mean from $\hat{s}_{(k)}$, i.e. compute $\hat{s}_{(k)}$ as:

$$\hat{s}_{(k)} = y_{m(k)} - y_{m(k+1)} - mean(y_{m(k)} - y_{m(k+1)}) \quad (8)$$

If the spacing of track k and track k+1 is closer than the nominal distance at a particular sector, then the corresponding element of the vector $\hat{s}_{(k)}$ is positive. Similarly, if the spacing of track k and track k+1 is larger than the nominal distance at a particular sector, then the corresponding element of the vector $\hat{s}_{(k)}$ is negative.

The dynamic track spacing error, using the equations above, is determined on each pair of adjacent tracks. Once the dynamic track spacing error is determined, appropriate correction factors 203 can be applied at each servo sector to modify the track center (i.e., k, k+1, . . . k+n) and reduce track spacing inaccuracies. The correction factors 203 are typically written on the discs 108. In a preferred embodiment, each servo sector has a dedicated field where the dynamic track spacing correction factors 203 are stored. The correction factors 203 are read as part of the servo sectors during normal operation and added to the raw measured head 118 position. Thus, the original track centers 201 are modified and the resulting modified tracks 202 have significantly smaller dynamic track shape and dynamic track spacing errors than the original tracks 201.

Figure 4:
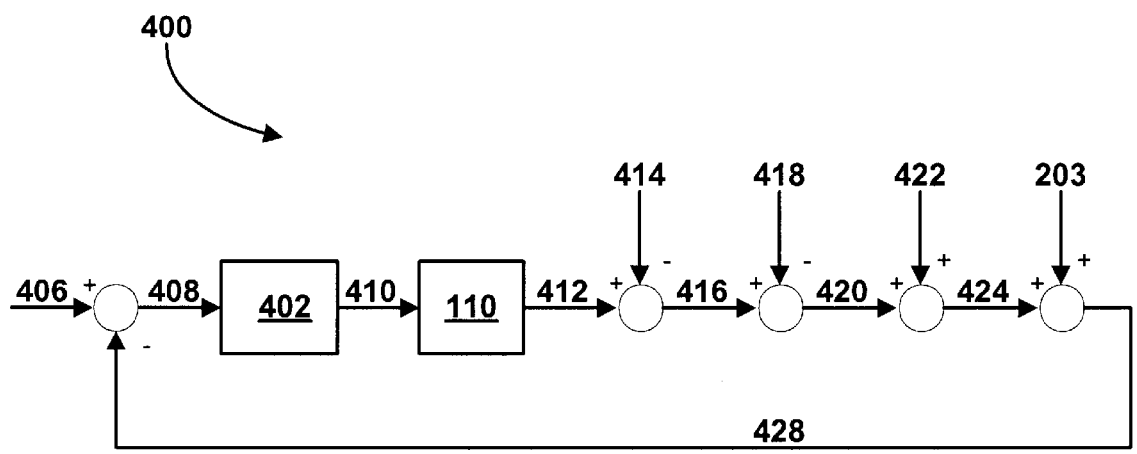
FIG. 4 is a model of a disc drive servo control system with ZAP correction.

FIG. 4 shows a block diagram of the control system 400 of the disc drive 100 according to a preferred embodiment of the present invention. The sequel subscript (k) in the various following signals denotes a propagation step. The notation $x_{(k)}$ will refer to the samples of signal x on track k in the remainder of this text. The description of the present invention assumes that tracks 120 are numbered from 1 to n, and therefore, the track 120 written in the kth propagation step will be referred to as track k.

The description of the various signals in FIG. 4 are as follows:

r (406): Set point.
p (408): Position error signal.
u (410): Actuator 110 input signal.
$y_a$ (412): Absolute head 118 position.
d (414): Non-repeatable position disturbance caused by disc 108 motion due to resonance, spindle vibration, etc. Other position disturbances, such as head 118 motion due to wind induced actuator resonance among others, are also included in this signal.

y (416): Head 118 position relative to the disc 108.

$y_{(k)}$ (418): Absolute track shape error of the track 120 followed by the head 118.

$y_r$ (420): Head 118 position relative to the track 120 center.

m (422): Measurement noise.

$y_m$ (424): Measured head 118 position.

$w_{(k)}$ (203): ZAP correction 203 belonging to the track 120 being followed by the head 118. The value of $w_k$ 203 is typically set to be equal to the estimated track shape error of track k.

$y_w$ (428): ZAP corrected measured head position.

Controller 402 in FIG. 4 represents the servo controller for the disc drive 100. The input of the controller 402 is the position error signal p 408, which is derived by subtracting the corrected measured position $y_w$ 428 from the set point input r 406. The set point input r 406 is used to adjust the desired position of the actuator 110. The output of the controller 402 is signal u 410, which is fed into the input of the actuator 110. The read and write transducer elements are positioned by the actuator 110. In a typical disc drive 100 the actuator 110 is a rotary actuator assembly 110 moved by a voice coil motor (VCM) 124.

The output of the actuator 110 is the absolute position of the heads 118, which is represented by signal $y_a$ 412. Magnetoresistive read elements are employed in the heads 118 of many disc drives 100. The read and write elements may have significant offset, i.e. the radial position of the read and write elements, relative to the center of the disc 109 surface, may be different. The description of the present invention, for simplicity, assumes that the offset of the read and write elements is zero, i.e. signal $y_a$ 412 represents the position of both elements. However, the methods presented in this invention, with minor corrections, can be easily applied to situations where the read/write element offset is not zero.

Signal d 414 represents various non-repeatable position disturbances. Non-repeatable disturbances are typically caused by undesired motion of the disc 108 due to disc resonance, disc flutter, spindle vibration, etc.

The relative position of the head 118 and the disc 108 is represented by y 416. The value for y 416 is obtained by summing the absolute head position $y_a$ 412 and the absolute disc position d 414. In the remainder of this description, it is assumed that signals representing motion toward the inner diameter (ID) of the disc 108 have a positive sign, and signals representing motion toward the outer diameter (OD) of the disc 108 have a negative sign. If the disc 108 moves toward the ID, then d 414 changes in the positive direction. However, if the relative position of the disc 108 and head 118 (i.e., signal y 416) is monitored, it appears as if head 118 moved toward the OD relative to disc 108. In other words, y 416 should decrease, and therefore, the summing junction of $y_a$ 412 and d 414 has a negative sign for d 414.

The relative position of the disc 108 and actuator assembly 110 cannot be measured directly. The position measurement is obtained by monitoring the signal generated in the read element by the magnetic marks written in the track 120 followed by the head 118. Thus, the location of the head 118 is measured relative to the written track 120. As a consequence, any irregularities in the shape of the track 120 directly influence the position measurement. Signal $y_r$ 420 represents the relative position of the head 118 and the track 120 followed by the head 118. Signal $y_r$ 420 is obtained by subtracting the shape of the track 120 from the relative motion of the disc 108 and head 118.

The position measurement unfortunately has some inaccuracy due to media noise and electrical noise among others. The measurement error in the position measurement is denoted by the signal m 422. The sum of the head 118 position relative to the previous track 120, $y_r$ 420, and the measurement noise, m 422, gives the actual measured head 118 position, $y_m$ 424.

As previously discussed, irregularities in the shape of the track 120 followed by the head 118 may get amplified in a self-propagating servo writing process. Amplification of irregularities may result in unacceptably large deviation from the ideal perfectly circular track shape within a few hundred propagation steps. The purpose of the ZAP correction signal, w 203, is to correct the imperfections of the track 120 shape and to prevent unacceptable growth of errors.

Ideally, the ZAP correction signal 203 is determined such that $w_{(k)} = y_{(k)}$. The ZAP correction 203 would then exactly cancel the written in errors of the track 120 being followed, and the actuator 110 would attempt to follow a perfectly circular track 120. This significantly reduces the absolute track shape error and track spacing error. The ZAP correction factors 203 are stored on the disc 108 (typically in a dedicated field in each servo sector). The ZAP correction factors 203 are also read and used to correct the measured actuator 110 position during the normal operation of the disc drive 108. The ideal modified track centers 202 will thus be perfectly circular and parallel with each other.

Application to conventionally written servo tracks

Figure 5:
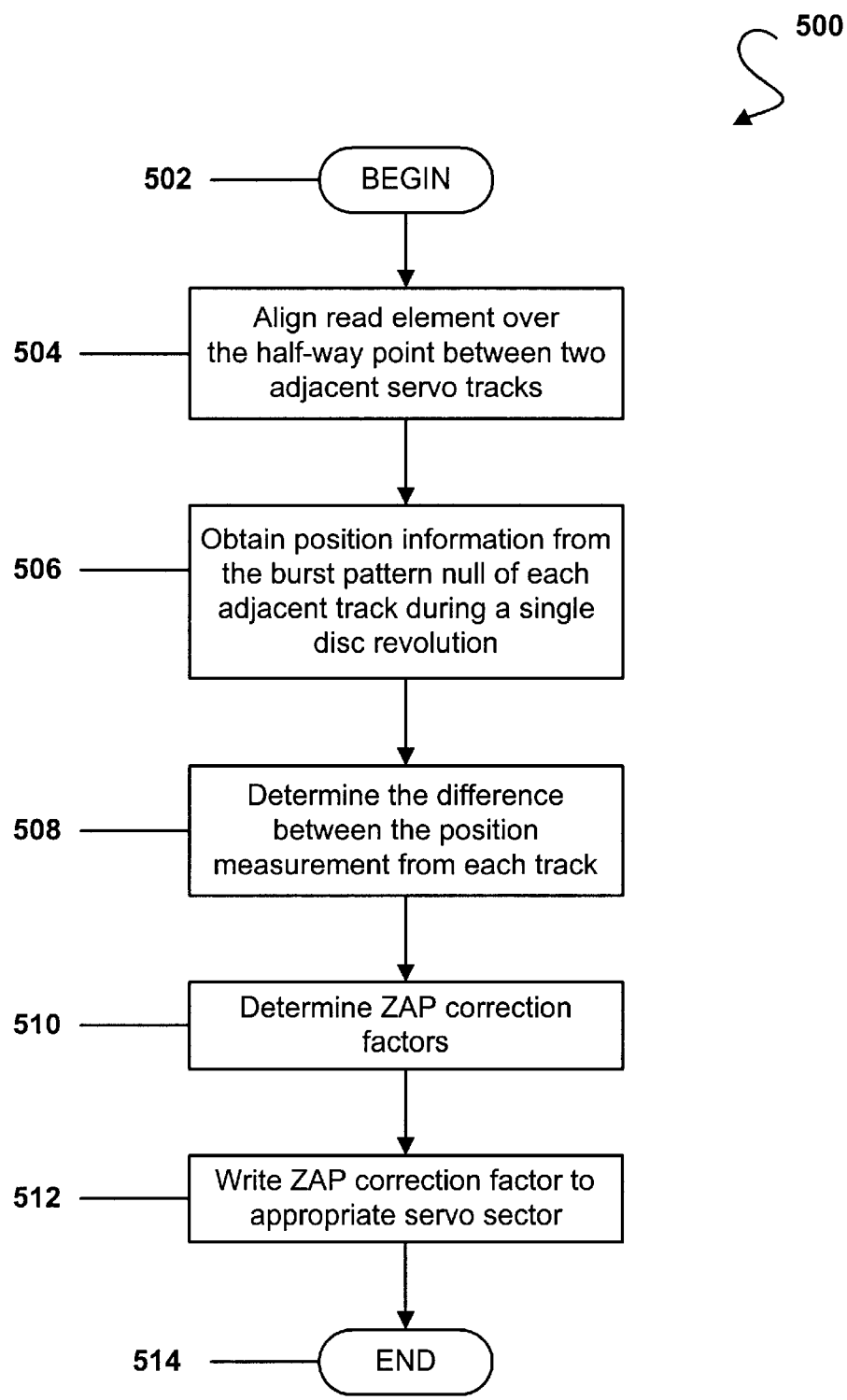
FIG. 5 is an operational flow chart of a preferred embodiment of the present invention related to determining ZAP correction factors for use with conventional servowriting methods.

FIG. 5 illustrates the operational process 500 used to generate the ZAP correction signal $w_{(k)}$ 203 for conventionally written servo tracks 120 according to a preferred embodiment of the present invention. The dynamic track squeeze measurement will be used to generate $\hat{y}_{(k)}$, which is the estimate of the shape of each track k (i.e. $\hat{y}_{(k)} \approx y_{(k)}$). Dynamic track shape and track spacing errors are significantly reduced by setting the ZAP correction signal $w_k = \hat{y}_k$. Operational process 500 is initiated by operation 502. Control is passed to operation 504 once operational process 500 is initiated.

Operation 504 aligns the read element half way between a first and a second servo track 120. The first and second servo tracks 120 are adjacent to each other. In a preferred embodiment, the ZAP correction factors 203 have already been determined (using prior art methods) and written to the first servo track (i.e., $\hat{y}_{(0)}$ is determined such that $\hat{y}_{(0)} \approx y_{(0)}$ for track k, where k=0). The read element is positioned half way between track k and adjacent track k+1 using normal servo-positioning techniques (i.e., r=k+0.5). The servo positioner follows track k during the subsequent disc 108 revolution. Operational control is then surrendered to operation 506.

Operation 506 assumes control from operation 504. Operation 506 obtains read element position information from the burst pattern null of each track (i.e., track k and track k+1) as the read element follows the previously ZAP corrected servo track during a single disc revolution. In a preferred embodiment, an ABCD (quadrature) split burst servo pattern 300 is used to obtain the read element position information. If the read element is aligned half way between track k and track k+1, the position information read from the burst pattern null of track k and from the burst pattern null of track k+1 (i.e., $y_{m(k)}$ and $y_{m(k+1)}$, respectively) should be identical if the dynamic track squeeze is equal to zero. After gathering positional information from the burst pattern null of track k and track k+1, operational control is surrendered to operation 508.

Operation 508 determines the difference between the position measurements obtained for each track 120 in operation 506. In the preferred embodiment, the read element is aligned equal-distant between both track k and track k+1. As such, the position measured from each track 120 should be the same. The difference between the two measurements represents the dynamic track spacing error (i.e., $\hat{s}_k$ where $\hat{s}_{(k)}=y_{m(k)}-y_{m(k+1)}$). It is assumed, for simplicity, that $\hat{s}_k$ has a zero mean value. A non-zero mean value within vector s due to static track spacing error and various offsets, if present, is removed by subtracting the mean from each element of $\hat{s}_{(k)}$.

Operation 510 assumes control from operation 508 after the difference between the position measurements from each track is determined. Operation 510 determines a corresponding ZAP correction factor 203 to eliminate any difference between the measurements obtained in operation 508. In a preferred embodiment, the ZAP correction factor 203, $\hat{y}_{k+1}$, is computed by setting $\hat{y}_{(k+1)}=a\hat{y}_{(k)}+\hat{s}_{(k)}$, where a will be referred to as the "recursive stabilization factor". The value $\hat{y}_{k+1}$ represents the estimated absolute track shape error of track k+1, and $\hat{y}_{k+1}$ can be used as the ZAP correction factor 203 for track k+1. Typically a is a positive constant with a value between 0.7 and 0.95. In certain applications, it may be preferable to use a frequency dependent recursive stabilization factor, a(ω), where ω denotes the frequency.

Operation 512 then assumes control and writes the ZAP correction factors 203 (i.e., $\hat{y}_{(k+1)}$) determined in operation 510 into the appropriate servo sector. In a preferred embodiment, the ZAP correction factors 203 are written into the servo sectors of track k+1. When the head 118 is positioned at track k+1 during normal operation of the drive 100, the ZAP correction factors 203 are read as part of the servo sectors and used to correct the measured position of the head 118 (i.e., $w_{(k+1)}=\hat{y}_{(k+1)}$). Writing the correction factors 203 may require positioning the head 118 such that the write element aligns with track k+1. It should be noted that in many disk drives, data is not written on every servo track 120, and in such a case, it may be desirable to write ZAP correction factors 203 only on tracks 120 where data is stored. Thus, if no data is going to be stored on a particular track 120, operation 512 may be skipped. Operation 512 (or operation 510 if operation 512 is skipped) surrenders control to operation 514. Operation 514 assumes control from operation 512 (or operation 510 if operation 512 is skipped) and terminates operational process 500.

Figure 6:
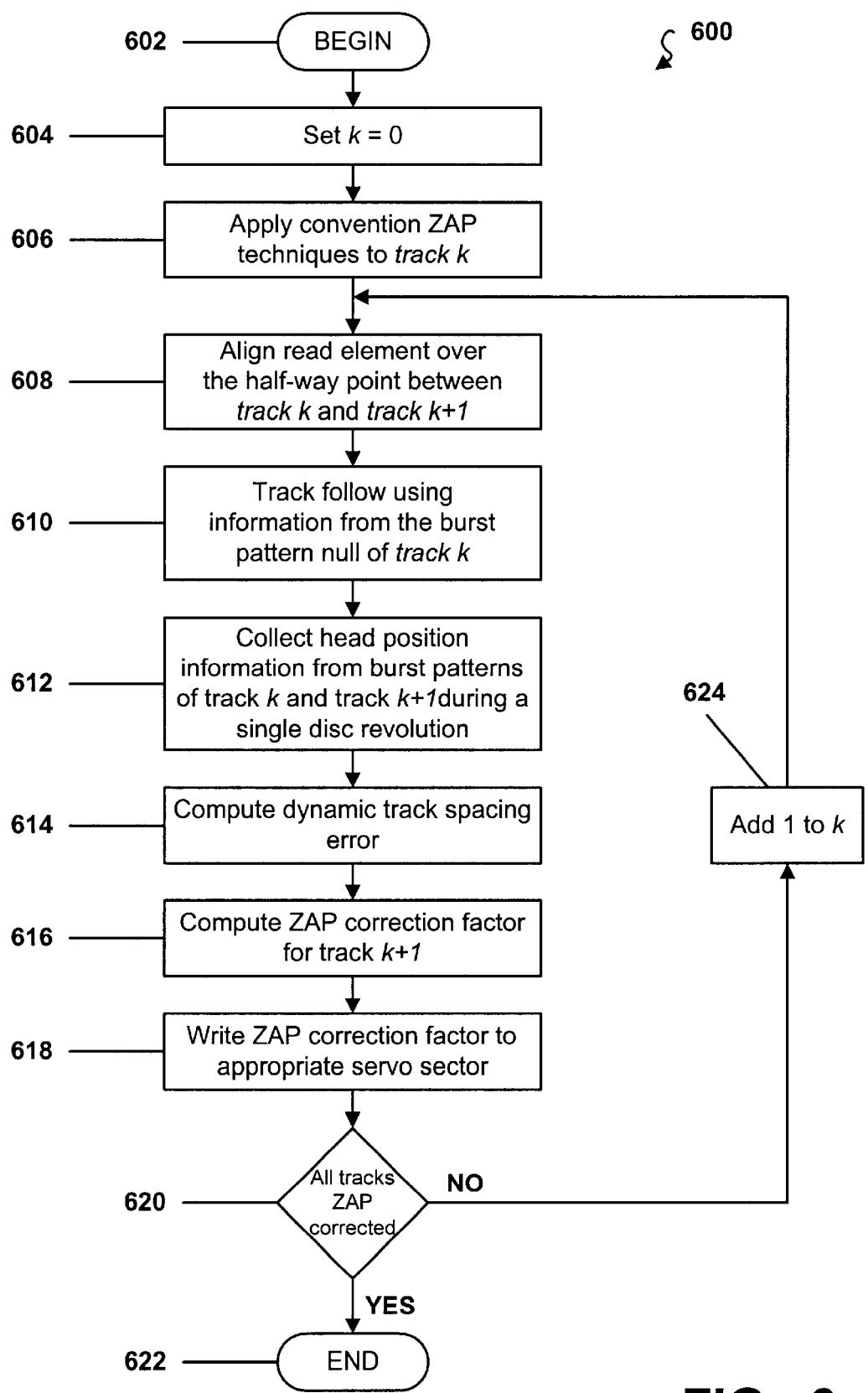
FIG. 6 is an operational flow chart of a preferred embodiment of the present invention related to determining ZAP correction factors for use with conventional servowriting methods.

FIG. 6 illustrates the detailed operational process 600 used to generate the ZAP correction signal $w_{(k)}$ 203 according to a preferred embodiment of the present invention for application to disc drives 100 employing conventional servo track writing. Operational process 600 is implemented, in the preferred embodiment, after the servo tracks 120 have been written onto the disc 108 with a conventional servowriter. In an alternative embodiment, operational process 600 is implemented while the servo tracks 120 are being written with the conventional servowriter. The dynamic track squeeze measurement obtained in operational process 600 will be used to generate $\hat{y}_{(k)}$, which is the estimate of the shape of each track k (i.e., $\hat{y}_{(k)} \approx y_{(k)}$). Setting the ZAP correction signal $w_k$ equal to $y_k$ significantly reduces dynamic track shape and track spacing errors. Operational process 600 is initiated by operation 602. Control is passed to operation 604 once operational process 600 is initiated.

Operation 604 sets the value of k equal to zero. The value k represents the track number and ranges from zero to n, where n represents the number of tracks 120 to which correction factors are to be added. Operational control then shifts to operation 606.

Operation 606 applies conventional ZAP correction methods (such as recursive estimation and inverse transformation among others) to generate the ZAP correction signal for the initial track (i.e., to determine $\hat{y}_{(0)}$ such that $\hat{y}_{(0)} \approx y_{(0)}$). The ZAP correction signal (i.e., $\hat{y}_{(0)}$) is written to track 0. In a preferred embodiment, track 0 corresponds to the track 120 closest to the inner diameter ("ID") of the disc 108. Furthermore, the ZAP correction factors 203 of the present invention are sequentially (i.e., track 1, track 2, track 3 . . . track n) determined for tracks 120 from the ID to the outer diameter ("OD"). It should be noted, however, that the present invention can be used to determine the ZAP correction factors 203 regardless of the order in which the tracks 120 are presented. For example, track 0 can represent the track closest to the OD of disc 108 and the sequence of tracks can be from the OD to the ID. Furthermore, the present invention is applicable even if the track sequence is altered. After the ZAP correction signal 203 is determined for track 0, control passes to operation 608.

Operation 608 assumes control from operation 606 after the ZAP correction signal 203 is determined. Operation 608 positions the read element half way between track k and track k+1. In the preferred embodiment, the read element is positioned half way between track k and track k+1 by setting the set-point input r 406 of the controller 402 equal to k+0.5. Control then passes to operation 610.

Operation 610 track follows (i.e., maintains the position of the read element) half way between track k and track k+1for a complete revolution of the disc 108. In a preferred embodiment, the servo controller follows the track 120 that has already had ZAP correction factors 203 added to its servo sectors. For example, the servo controller follows track 0 when gathering position information from track 0 and track 1. ZAP correction factors 203 were previously added to track 0 in operation 606. As the process of the present invention progresses, ZAP correction factors 203 are added to track 1. During the next iteration (i.e., when the head is located between track 1 and track 2), the servo controller follows track 1 and ZAP correction factors 203 are added to track 2. Although a ZAP corrected track is followed in the preferred embodiment, the servo controller can obtain following information from non-ZAP corrected tracks.

Operation 612 assumes control from operation 610. Operation 612 collects head 118 position data from both track k and track k+1 during the track following revolution of operation 610. The head 118 position information is gathered by passing the read element over a portion of the servo burst pattern 300 of track k and track k+1. In a preferred embodiment, the read element is passed over the ABCD burst pattern 300. The head 118 position data from track k and track k+1 corresponds to $y_{m(k)}$ and $y_{m(k+1)}$, respectively, which are determined using equation 1 and equation 2 discussed previously.

Operation 614 assumes control from operation 612 and computes the estimated dynamic track spacing error. In a preferred embodiment, the difference between the two measurements represents the dynamic track spacing error (i.e., $\hat{s}_k$ where $\hat{s}_{(k)}=y_{m(k)}-y_{m(k+1)}$). It is assumed, for simplicity, that $\hat{s}_k$ has a zero mean value. A non-zero mean value within vector s due to static track spacing error and various offsets, if present, is removed by subtracting the mean from each element of $\hat{s}_{(k)}$.

Operation 616 assumes control from operation 614. Operation 616 computes the ZAP correction factor 203 for track k+1. In a preferred embodiment, the ZAP correction factor 203 for track k+1 is computed as $\hat{y}_{(k+1)}=a\hat{y}_{(k)}+\hat{s}_{(k)}$, where a will be referred to as the "recursive stabilization factor". The value $\hat{y}_{k+1}$ represents the estimated absolute track shape error of track k+1, and $\hat{y}_{k+1}$ can be used as the ZAP correction factor 203 for track k+1. Typically a is a positive constant with a value between 0.7 and 0.95. A frequency dependent recursive stabilization factor, a(ω), where ω denotes the frequency, may be preferable to a in certain applications. Operational control shifts to operation 618 after the ZAP correction factor 203 for track k+1 is computed by operation 616.

Operation 618 writes $\hat{y}_{(k+1)}$ (i.e., the estimated track shape error of track k+1) into the ZAP correction fields of track k+1. In a preferred embodiment, operation 618 includes positioning the head 118 such that the write element aligns with track k+1 when writing $\hat{y}_{k+1}$ to the ZAP correction fields of track k+1. When the head 118 is positioned at track k+1 during normal operation of the drive, the ZAP correction factors 203 are read as part of the servo sectors and used to correct the measured position of the head 118 (i.e., $w_{(k+1)} = \hat{y}_{(k+1)}$). In an alternative embodiment, ZAP correction factors 203 are only written on tracks 120 where data is stored. In some disc drives, data is not written on every servo track 120. Thus, if no data is going to be stored on a particular track 120 and ZAP correction factors 203 are not desired, operation 618 is skipped for that particular track 120.

Determination operation 620 assumes control from operation 618 (or from operation 616 if operation 618 is skipped as in the alternative embodiment). Determination step 620 ascertains whether all tracks 120 have been ZAP corrected. Control branches YES if all tracks 120 have been ZAP corrected. Conversely, control branches NO if all tracks 120 have not been ZAP corrected. In a preferred embodiment, determination step 620 compares k to n, where n represents the number of tracks 120 to be ZAP corrected. If k≥n, all tracks 120 have been ZAP corrected and control branches YES. If k<n, all tracks 120 have not been ZAP corrected and control branches NO.

Operation 622 assumes control if determination step 620 branches YES and no more tracks 120 are to be ZAP corrected. Operation 620 terminates operational process 600.

Operation 624 assumes control if determination step 620 branches NO and ZAP correction factors 203 are to be determined for additional tracks 120. Operation 624 adds 1 to the value of k. In a preferred embodiment, the value of k ranges from 0 to n. Operation 624 then passes control back to operation 608. Operations 608 through 624 or operational process 600 are repeated until determination step 620 branches YES and operation 622 terminates operational process 600.

Stability of Recursive Track Shape Estimation

This section provides a necessary and sufficient condition for the convergence and stability of the recursive track shape estimation process. The ZAP correction factor for track k+1 in operation 616 of the previous section is found by estimating $\hat{y}_k+1$ as:

$$\hat{y}_{(k+1)} = a\hat{y}_{(k)} + \hat{s}_{(k)} \tag{9}$$

Using Eq. 6 the estimated track shape can be expressed as:

$$\hat{y}_{(k+1)} = a\hat{y}_{(k)} + \hat{s}_{(k)} + a\hat{y}_{(k)} + y_{(k+1)} - y_{(k)} + m_{(k)} \tag{10}$$

The estimation error is the difference of the estimated track shape error and the real track shape error, i.e. $e_k = \hat{y}_k - y_k$. The estimation error for track k+1 can be computed as:

$$\begin{aligned} e_{(k+1)} &= \hat{y}_{(k+1)} - y_{(k+1)} = a\hat{y}_{(k)} + y_{(k+1)} - y_k + m_{(k)} - y_{(k+1)} \\ &= a(\hat{y}_{(k)} - y_{(k)}) + (a-1)y_{(k)} + m_{(k)} \\ &= ae_{(k)} + (a-1)y_{(k)} + m_{(k)} \end{aligned} \tag{11}$$

Note that Eq. 11 is a difference equation of the form:

$$e_{(k+1)} = ae_{(k)} + v_{(k+1)} \tag{12}$$

where $$v_{(k+1)} = (a-1)y_{(k)} + m_{(k)} \tag{13}$$

Assuming that v is bounded, the estimation error e will be bounded if and only if |a|<1. In other words, the recursive track shape estimation process is stable if and only if |a|<1.

The measurement error $m_{(k)}$ is approximately 2% of the track pitch in a typical disk drive. The track shape error $y_{(k)}$ is determined by the accuracy of the servo track writer equipment and the disk drive's mechanical system. The value of $y_{(k)}$ is typically in the range of 5 to 10% of the track pitch. Therefore if the disk drive has been servo written on conventional servo track writer equipment, then v is bounded. Thus the recursive track shape estimation process is stable if and only if |a|<1.

Practical Considerations of Choosing Constant a

A guide for choosing an appropriate value for the weighting factor a will is presented in this section. Signal $e_{k+1}$ in Eq. 11 is a direct measure of the dynamic track shape error after applying ZAP correction. The dynamic track spacing error (i.e. track squeeze) between two adjacent ZAP corrected 203 servo tracks 120 can be obtained by computing the difference of the shape of two adjacent tracks:

$$\begin{aligned} s'_{(k+1)} &= (\hat{y}_{(k+1)} - y_{(k+1)}) - (\hat{y}_{(k)} - y_{(k)}) \\ &= a\hat{y}_{(k)} + y_{(k+1)} - y_{(k)} + m_{(k)} - y_{(k+1)} - \hat{y}_{(k)} + y_{(k)}) \\ &= (a-1)\hat{y}_{(k)} + m_{(k)} \end{aligned} \tag{14}$$

The difference equation given in Eq. 12 can be considered as a first order discrete low pass filter, where a is the filter pole and $v_{(k+1)}$ is the input. This first order low pass filter, however, performs "track-to-track" filtering instead of "sector-to-sector" filtering. In other words, the output is the filtered track-to-track variation of the value of signal v at a particular sector.

Equation 13 shows that signal v has two major contributors. The first component, $(a-1)y_{(k)}$, contains dynamic track shape errors and the second term $m_{(k)}$, contains measurement noise. The dynamic track shape error and dynamic track spacing error can be determined for various choices of a according to Equations 11 and 14, respectively.

EXAMPLE

First, assume that the measurement noise m is a Gaussian noise with a standard deviation of 0.02. Next, assume the uncorrected track shape error, y, is approximated by a Gaussian noise with a standard deviation of 0.2. Then the magnitude of e gives the absolute track shape error (i.e. the non-circularity of the tracks). The relative track shape error (i.e. the track squeeze) is determined according to Eq. 14.

Figure 7:
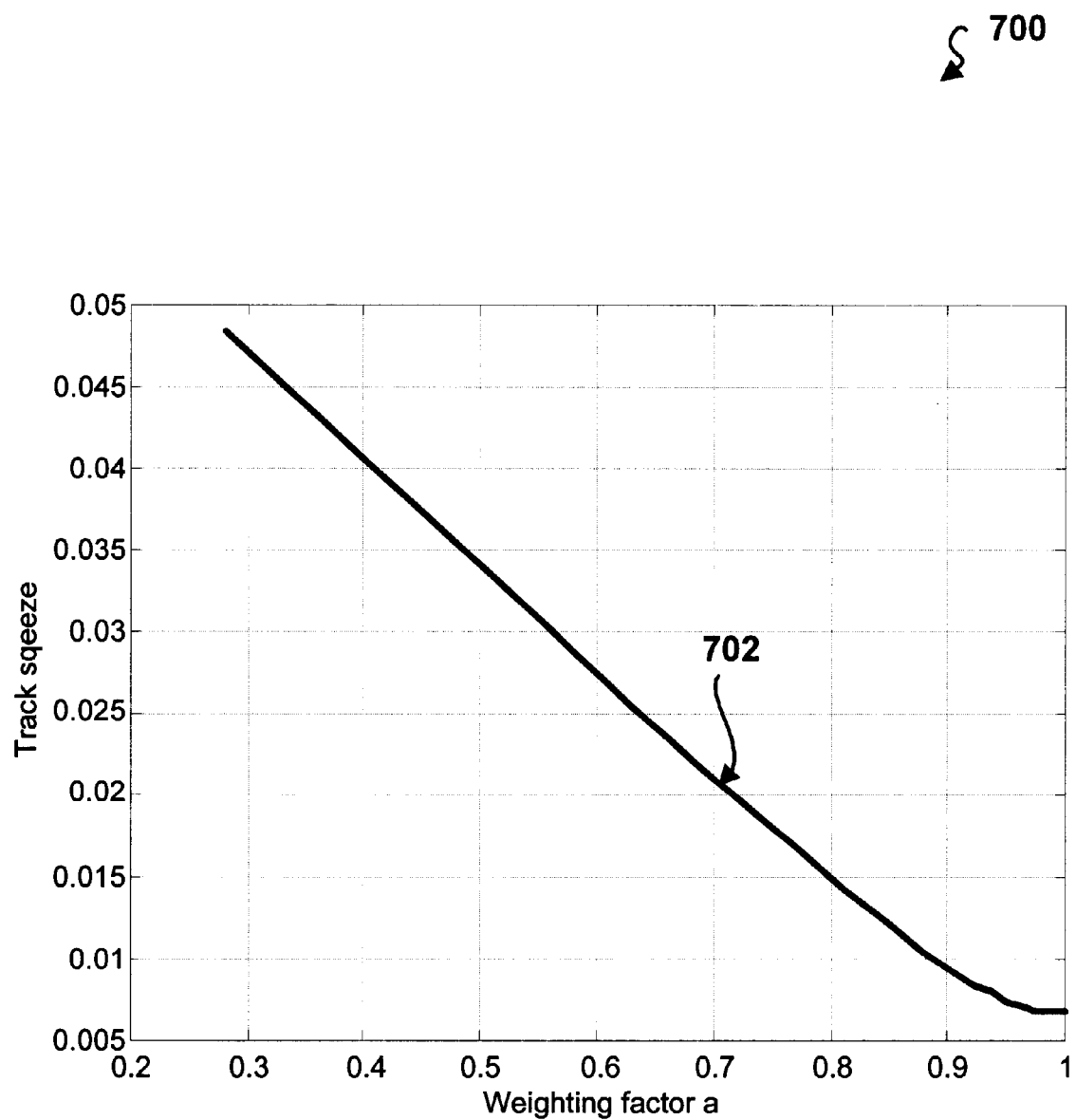

FIG. 7 illustrates the dynamic track spacing error as a function of a. Graph 700 is a plot of the standard deviation of track squeeze versus the value of a. Curve 702 represents the standard deviation of track squeeze for a particular value of a.

Figure 8:
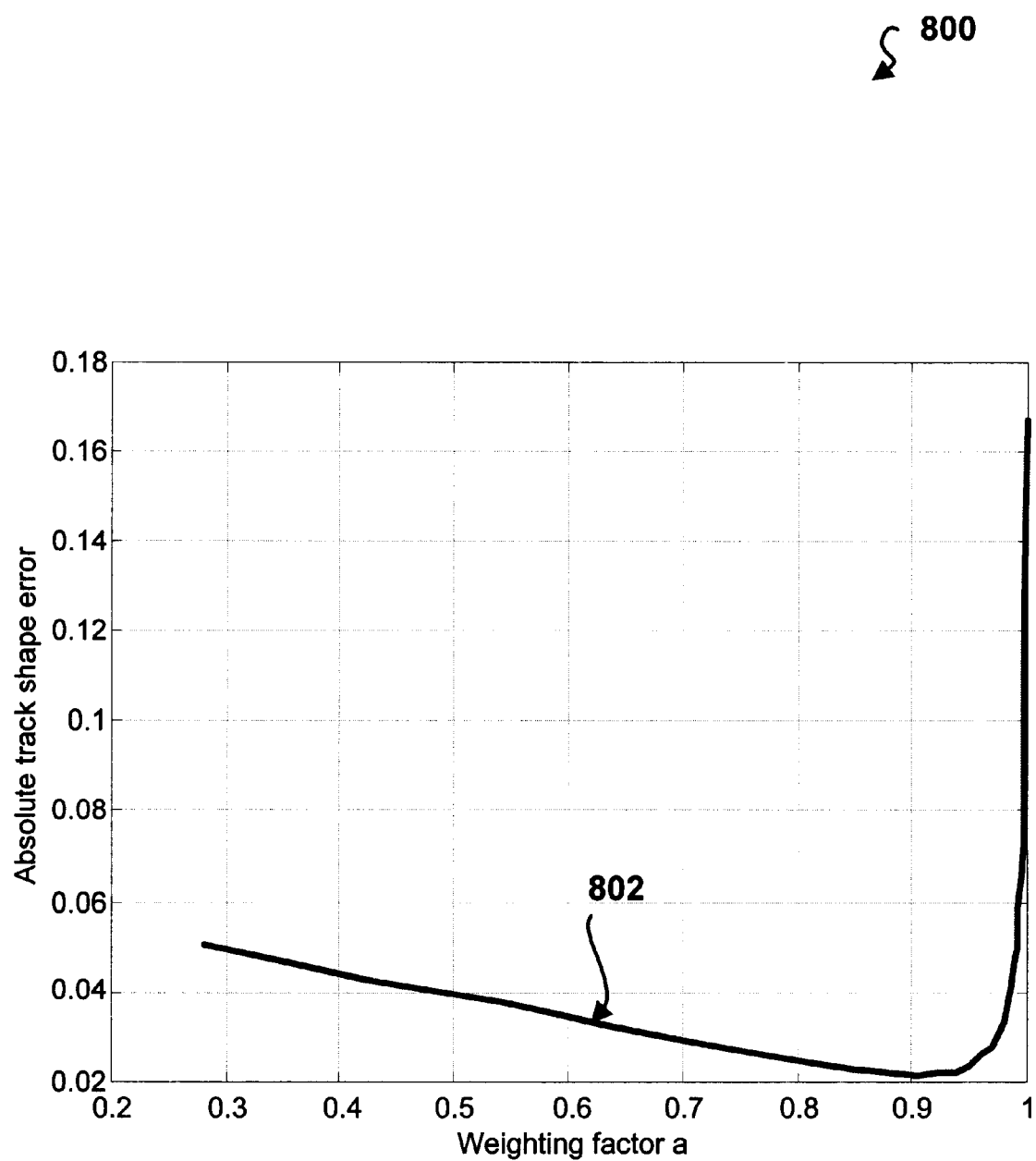

FIG. 8 illustrates absolute track shape error as function of a. Graph 800 is a plot of the standard deviation of absolute track shape error versus the value of a. Curve 802 represents the standard deviation of absolute track shape error for a particular value of a.

The goal is to select the weighting factor a such that both the track spacing and track shape errors are reasonably small. For example, the choice of a=0.95 results in an absolute track shape error of 0.02 standard deviation, and relative track shape error of 0.01 standard deviation. The absolute track shape error is less critical than the relative track shape error in a typical hard disk drive. This choice is acceptable in a typical hard disk drive.

Application to Self-propagated Servo Track Writing

Figure 9:
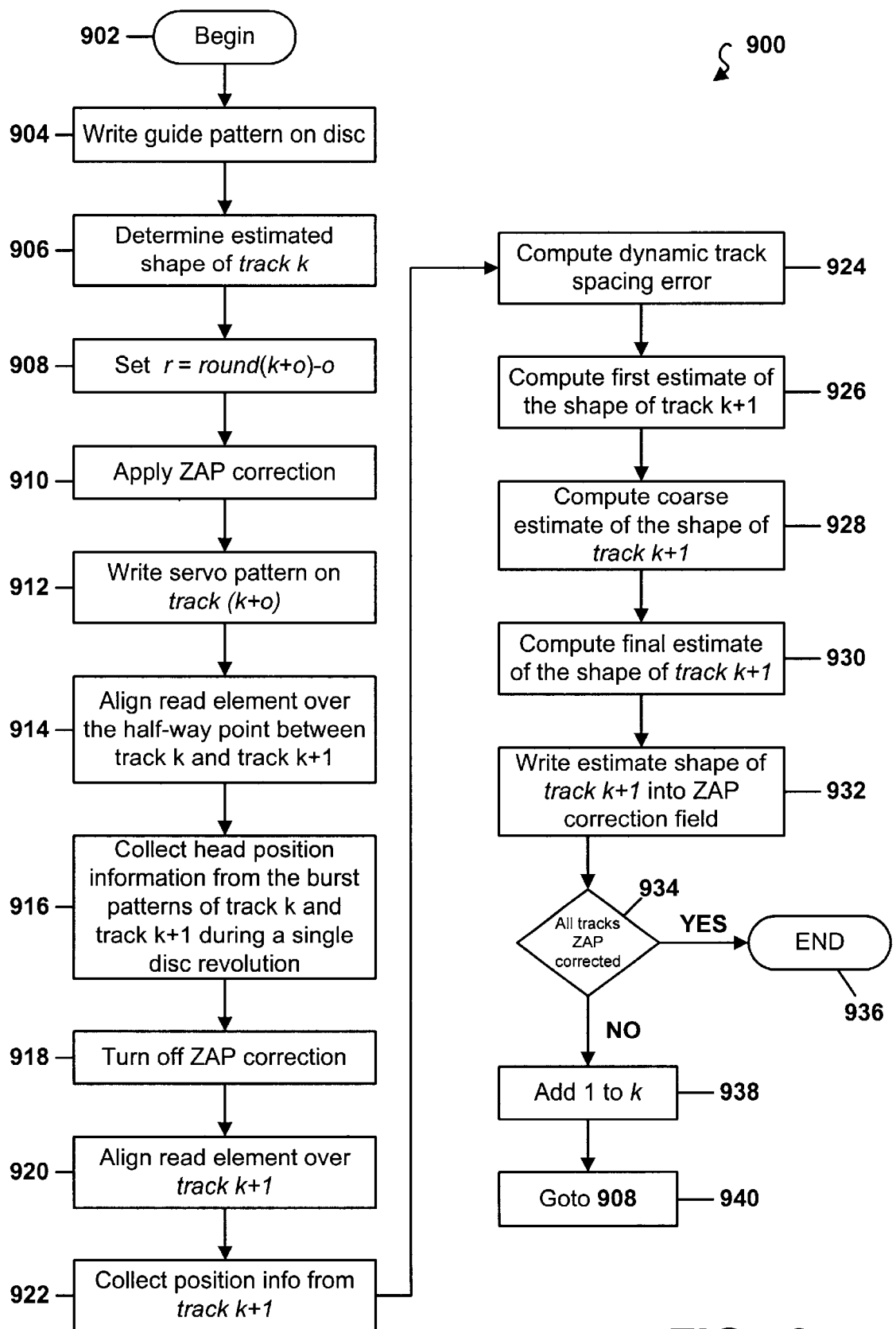
FIG. 9 is an operational flow chart of a preferred embodiment of the present invention relating to determining ZAP correction factors for use with self-propagating servo track writing.
Figure 10:
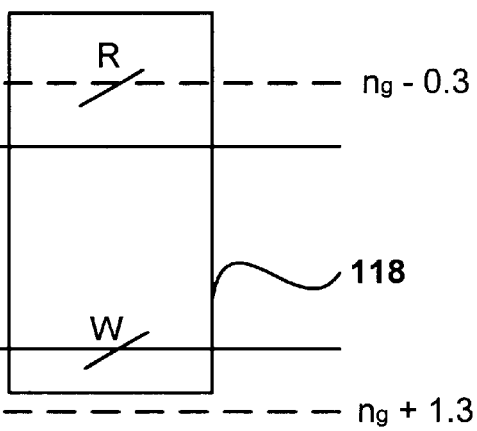
FIG. 10 is an illustration of the alignment of the read/write head as related to a preferred embodiment of the present invention.
Figure 11:
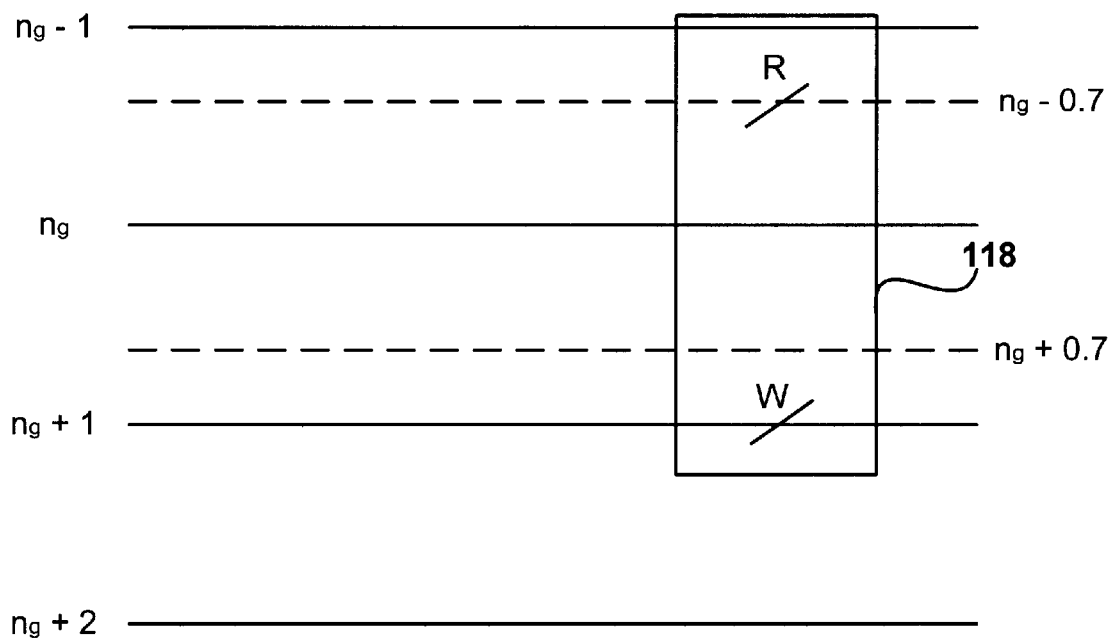
FIG. 11 is an illustration of the alignment of the read/write head as related to a preferred embodiment of the present invention.

FIG. 9 illustrates the detailed operational process 900 used to generate the ZAP correction signal $w_{(k)}$ 203 applicable to disc drives 100 employing self-propagated servo track writing according to a preferred embodiment of the present invention. FIG. 10 and FIG. 11 illustrate the positioning of the read/write head 118 during implementation of operational process 900. As previously shown, the recursive track shape estimation process, for conventional servo writing, is stable if and only if signal $v_{k+1}$ in Eq. 12 is bounded, and $|a|<1$, however, this condition is not sufficient to guarantee stability during self-propagated servo track writing.

When a new track 120 is being written during self-propagated servo writing, the servo system monitors the signal generated in the read element by the servo pattern 300 written in the previous track 120. The servo system attempts to follow the previous track 120, and as a result, the new track 120 inherits the shape of the previous track 120. Furthermore, some irregularities in the shape of the previous track 120 are amplified as the servo writing propagates when the servo system's closed loop gain is larger than unity at certain frequencies.

Signal $y_{(k)}$ in Eq. 13, therefore, may not be bounded. As a consequence, $v_{k+1}$ may not be bounded either. This may result in the growth of unbounded track shape errors, i.e. the recursive track shape estimation process may become unstable. An extra revolution is used to measure the position error signal on each track 120 and to estimate the absolute track shape error in order to stabilize the process. The estimate of the absolute track shape error, with a small weighing factor, is added to the recursive track shape estimate to stabilize the estimation process.

Although one method of self-propagated servowriting is used to demonstrate a preferred embodiment of the present invention, the present invention is applicable to other self-propagated servo track writing approaches with minor modifications.

Operational process 900 is initiated by operation 902. In a preferred embodiment, operational process 900 is initiated during the ECHO self-propagated servo writing process in order to eliminate and/or prevent the propagation of track shape errors. Control is passed to operation 904 once operational process 900 is initiated.

Operation 904 writes a servo track guide pattern on the disc 108. In the preferred embodiment, the guide pattern is written at the inner diameter ("ID") 1001 of the disc 108 using a conventional servowriting machine and the ECHO propagation proceeds from the ID 1001 to the outer diameter ("OD") 1002 of the disc 108. The number of tracks, $n_g$, in the servo track guide pattern is greater than the offset, o, between the read element and the write element of the read/write head 118 used in the ECHO process. The outermost track in the servo track guide pattern (i.e., the track closest to the OD 1002 in the guide pattern) is designated as track $n_g$ (see FIG. 10 and FIG. 11). The first servo track to be written after the guide pattern is placed on the disc 108 is designated as track $n_g+1$ (see FIG. 10 and FIG. 11). After the servo track guide pattern is written, operation control is surrendered to operation 906.

Operation 906 determines the estimated shape of track k. In the preferred embodiment, the set-point, r 406, is set equal to k, where k is equal to round($n_g+1-o$). The "round" operation rounds the value ($n_g+1-o$) to the next highest integer. In other words, the read element is aligned over a track center, a number of o tracks 120 from the end of the guide zone. After the read element is aligned over the correct track 120, conventional ZAP correction techniques (such as recursive estimation, inverse transformation, or a combination of the two among others) are applied to determine $\hat{y}_k$ the estimated shape of track k, such that $\hat{y}_k \approx y_k$.

Operation 908 then assumes control from operation 906 after the estimated shape of track k is determined. Operation 908 resets the set-point r 406 to the value r=round(k+o)−o. Resetting the set-point r 406 causes the servo positioner to displace the read/write head 118. In the preferred embodiment, the write element is aligned with track k+o when r=round(k+o)−o. Track k+o represents the next servo track to be written. The reader follows track k while writing track k+o. The read element, because of the offset and rounding operation, may not be positioned exactly over the center of track k during the follow stage.

FIG. 10, for example, illustrates the alignment of the read/write head 118 with an offset of 1.3 tracks. If o equals 1.3, and r=k (where k=$n_g$), r is computed as:

$r=\text{round}(k+o)-o$ $r=\text{round}(n_g+1.3)-1.3$ $r=n_g+1-1.3$ $r=n_g-0.3$

The read element ("R") is aligned over track $n_g$−0.3 as shown in FIG. 10. The write element ("W"), due to the track offset of 1.3 tracks, is therefore positioned at location $n_g+1$, the next track to be written.

FIG. 11, for example, illustrates the alignment of the read/write head 118 with an offset of 1.7 tracks. If o equals 1.7, and r=k (where k=$n_g$−1), r is computed as:

$r=\text{round}(k+o)-o$ $r=\text{round}(n_g-1+1.7)-1.7$ $r=\text{round}(n_g+0.7)-1.7$ $r=n_g+1-1.7$ $r=n_g-0.7$ The read element ("R") is aligned over track $n_g$−0.7 as shown in FIG. 11. The write element ("W"), due to the track offset of 1.7 tracks, is therefore positioned at location $n_g+1$, the next track to be written.

Operation 910 assumes control after operation 908 sets r=round(k+o)−o. Operation 910 applies the ZAP correction factor 203 to the servo controller. In the preferred embodiment, operation 910 sets $w_k=\hat{y}_k$, the estimated shape of track k determined in operation 906. The ZAP correction factor 203 applied by operation 910 causes the read element to follow a nearly circular path around the disc 108, thereby improving the shape of track k+o that is to be written by the write element.

Operation 912 then assumes control from operation 910. As the read element is following the ZAP corrected track from operation 910, operation 912 applies a signal to the write element and writes a new servo pattern on track k+o. Track k+o will not inherit the track shape errors of the previous track (i.e., track k) because ZAP correction factors 203 have been applied to the previous track (i.e., track k).

Operation 914 then assumes control from operation 912 after a track k+1 is written. Operation 914 positions the read/write head 118 such that the read element is half way between track k and track k+1. In other words, the set-point input r 406 is set equal to k+0.5.

Operation 916 assumes control after the read element is positioned by operation 914. Operation 916 simultaneously collects position information from both track k and track k+1. In the preferred embodiment, the positional information for track k and track k+1, denoted as $x_k'$ and $x_{k+1}'$, respectively, is gathered in a single revolution of the disc 108.

Operation 918 assumes control from operation 916. Operation 918 turns off the ZAP correction being sent to the servo controller (i.e., sets $w_k$=0). Operational control is then shifted to operation 920.

Operation 920 positions the read element over track k+1. In the preferred embodiment, the set-point input r 406 is set equal to k+1. The servo controller follows the actual shape of track k+1 because the ZAP correction was turned off in operation 918.

Operation 922 assumes control from operation 920. Operation 922 uses the read element to collect position information from track k+1. In the preferred embodiment, the position information from track k+1 is denoted as $y_{m(k)}''$.

Operation 924 assumes control after the position information for track k+1 is gathered in operation 922. Operation 924 computes the recursive estimate of the dynamic track spacing error. In the preferred embodiment, the recursive estimate of the dynamic track spacing error is calculated as $\hat{s}_{(k)}=y_{m(k)}'-y_{m(k+1)}'$. The value $y_{m(k)}'$ represents the shape of track k and $y_{m(k+1)}'$ represents the shape of track k+1. It is assumed that s has a zero mean value. If vector s has a non-zero mean value due to static track spacing error and various offsets, then the non-zero mean value it is removed by subtracting the mean value from each element of $\hat{s}_k$.

Operation 926 assumes control after operation 924 computes the recursive estimate of dynamic track spacing error. Operation 926 computes the first estimate of the shape of track k+1. In a preferred embodiment, the first estimate of the shape of track k+1 is designated as $y_{(k+1)}'$ and is computed using the equation $\hat{y}_{(k+1)}'=a\hat{y}_{(k)}+\hat{s}_{(k)}$, where a represents the "recursive stabilization factor". Typically, a is a positive constant between 0.7 and 0.95. In certain applications, however, it may be preferable to use a frequency dependent recursive stabilization factor, $a(\omega)$, where $\omega$ denotes the frequency.

Operation 928 assumes control after operation 926 is complete. Operation 928 computes the coarse estimate of the shape of track k+1. In a preferred embodiment, the coarse estimate of the shape of track k+1 is designated as $y_{k+1}''$ and is computed using the equation $\hat{y}_{k+1}''=-y_{w(k+1)}(1+PC)$.

Operation 930 assumes control from operation 928 after the coarse estimate of the shape of track k+1 is computed. Operation 930 obtains the final estimate of the shape of track k+1. In the preferred embodiment, the final estimate of the shape of track k+1 is designated as $\hat{y}_{k+1}$ and is computed using the equation $\hat{y}_{k+1}=\hat{y}_{k+1}'+b\hat{y}_{k+1}''$, where that $\hat{y}_{k+1}$ is the estimated absolute track shape error of track k+1, and it can be used as the ZAP correction for track k+1. The value a is referred to as the "recursive stabilization factor" and the value b is referred to as the "absolute stabilization factor". Typically a is a positive constant with a value between 0.7 and 0.95, whereas typically b is a positive constant with a value between 0.05 and 0.3. In certain applications it may be preferable to use a frequency dependent recursive stabilization factor, $a(\omega)$, and a frequency dependent absolute stabilization factor, $b(\omega)$, where $\omega$ denotes the frequency.

Operation 932 assumes control after the final estimated absolute track shape error of track k+1 is determined in operation 930. Operation 932 writes the final estimated absolute track shape error of track k+1, determined in operation 930, into the ZAP correction fields of track k+1. In the preferred embodiment, the final estimated track shape error of track k+1 (i.e., $\hat{y}_{k+1}$) is written into the ZAP correction fields of track k+1. When the head is positioned at track k+1, during normal operation of the drive, the ZAP correction fields are read as part of the servo sectors and used to correct the measured position (i.e., $w_{k+1}=\hat{y}_{k+1}$) Writing the correction factors may require positioning the heads such that the write head aligns with track k+1. In an alternative embodiment, the estimated track shape error is not written to the ZAP correction fields of track k+1. For example if data is not going to be stored on track k+1, there may not be a need to write the ZAP correction factors.

Determination operation 934 assumes control from operation 932. Determination operation 934 ascertains whether all of the desired tracks 120 have been written and ZAP corrected. Operational control branches YES if all tracks have been written and ZAP correction factors 203 have been added to all of the desired tracks 120. In the preferred embodiment, operational control branches YES after all of the tracks 120 on the disc 108 have been written and ZAP correction factors 203 added to their servo sectors. In an alternative embodiment, ZAP correction factors are only added to the tracks 120 that contain data. Operation 936 assumes control after determination operation 934 branches YES. Operation 936 terminates operational process 900.

Operational control branches NO if all tracks have not been written or ZAP correction factors 203 have not been added to all of the desired tracks 120. In the preferred embodiment, it is desired that all of the tracks 120 on the disc 108 have been written and ZAP correction factors 203 added to their servo sectors. In an alternative embodiment, it is desired that only tracks 120 containing data have ZAP correction factors added to their servo sectors. Operational 938 assumes control after determination operation 934 branches NO.

Operation 938 increments the value of k in such a manner as to designate the next track 120 to have ZAP correction factors 203 determined. In the preferred embodiment, the value of k is incremented by one such that the ZAP correction factors are determined for the tracks 120 on the disc 108 in a sequential order. For example in the first iteration of process 900, after the servo track guide pattern was written on the disc 108, k was equal to $n_g$(i.e., the last track 120 written in the servo track guide pattern). In the second iteration of process 900, k is incremented by one. Once the value of k is incremented, operational control switches to operation 940. Operation 940 redirects control to operation 908 so that the estimated shape of track k can be determined and the process repeated.

The present invention offers a time efficient method of determining ZAP correction factors to correct dynamic track spacing errors. More specifically, the present invention determines ZAP correction errors in two disc revolutions.

In summary, an embodiment of the present invention can be viewed as a method (such as operational process 500) for determining a track shape error in a data storage device (such as 100) having a read/write head (such as 118) and a rotating data storage media (such as 108), wherein the read/write head (such as 118) traverses over a surface of the data storage media (such as 108), the data storage media (such as 108) having a first servo track (such as 120) with a servo burst pattern (such as 300) and a second servo track (such as 120) with a servo burst pattern (such as 300). The method (such as operational process 500) can be viewed as comprising the steps of: aligning the read/write head (such as 118) between the first servo track (such as 120) and the second servo track (such as 120); simultaneously gathering a first read/write head position reading from the servo burst pattern (such as 300) of the first servo track (such as 120) and a second read/write head position reading from the servo burst pattern (such as 300) of the second servo track (such as 120); and determining a difference between the first read/write head position reading and the second read/write head position reading.

Additionally, the method (such as operational process 500) can be viewed as further comprising the step of applying a correction factor (such as 203) to eliminate the difference between the first read/write head position reading and the second read/write head position reading obtained in a previous step of the process. The first servo track (such as 120) can be viewed as being adjacent to the second servo track (such as 120). Furthermore, gathering step of the method (such as operational process 500) can be viewed as being completed within a single revolution of the data storage media (such as 108). Finally, the method (such as operational process 500) can be viewed as further comprising eliminating a static track shape error component from the difference between the first read/write head position reading and the second read/write head position reading.

Alternatively, an embodiment of the current invention can be viewed as a method (such as operational process 900) for correcting a track shape error in a data storage device (such as 100) having a read/write head (such as 118) and a rotating data storage media (such as 108), wherein the read/write head (such as 118) has a read element and a write element, and the data storage media (such as 108) has a servo track (such as 120) with a servo burst pattern (such as 300), and the read/write head (such as 118) traverses a surface of the data storage media (such as 108). The method can be viewed as comprising the steps of: setting k equal to 0, wherein k represents a servo track (such as 120) number; applying a track shape error correction factor to a servo track k; aligning the read element between the servo track k and a servo track k+1; using positional information from a servo burst pattern (such as 300) of the servo track k to maintain the read element between the servo track k and the servo track k+1; gathering, simultaneously, a read/write head position reading from the servo burst pattern (such as 300) of the servo track k and a read/write head position reading from a servo burst pattern (such as 300) of the servo track k+1; determining the dynamic track spacing error between the servo track k and the servo track k+1; determining a track shape error correction factor (such as 203) for the servo track k+1; and, saving the track shape error correction factor for the servo track k+1.

Additionally, the method (such as operational process 900) can be viewed as further comprising the steps of: adding 1 to k and repeating the aligning step through the adding step previously discussed until a track shape error correction factor (such as 203) is associated with a desired number of servo tracks (such as 120). If desired, the track shape error correction factors (such as 203) may be determined and saved only for a servo track (such as 120) containing user data. The gathering step of the above-discussed method (such as operational process 900) can be viewed as being completed in a single revolution of the data storage media (such as 108). The track shape error correction factors (such as 203) can be viewed as being zero acceleration correction factors (such as 203). Furthermore, the determination step of the method (such as operational process 900) can be viewed as further comprising the step of eliminating a static track shape error component from the read/write head positional reading of track k and the read/write head positional reading of track k+1 obtained in the gathering step. Finally, the method (such as operational process 900) can be viewed as using the track shape error correction factor (such as 203) to eliminate a track shape error during normal operation of the data storage device (such as 100).

Alternatively, an embodiment of the present invention can be viewed as an apparatus for determining a track shape error of a servo track (such as 120) on a rotating data storage media (such as 108) in a data storage device (such as 100), the data storage device (such as 100) having an actuator arm (such as 110) with a read/write head (such as 118) attached thereto that traverses a surface of the data storage media (such as 108) and a servo controller operable to position the read/write head (such as 118) relative to the surface of the data storage media (such as 108), the read/write head (such as 118) having a read element. The apparatus can be viewed as comprising a controller operable to instruct the servo controller to position the read/write head (such as 118) such that the read element is aligned between a first servo track (such as 120) and a second servo track (such as 120), to simultaneously retrieve a position reading from the first servo track (such as 120) and a position reading from the second servo track (such as 120), to determine the track shape error from a difference between the position reading from the first servo track (such as 120) and the position reading from the second servo track (such as 120), to determine a track shape error correction factor (such as 203), and to save the track shape error correction factor (such as 203).

Additionally, the track shape error correction factor (such as 203) can be viewed as being a zero acceleration correction factor (such as 203). The controller can be viewed as being operable to save the track shape error correction factor (such as 203) within a servo sector located within the servo track (such as 120). The apparatus can be viewed as obtaining the position reading from the first servo track (such as 120) a servo burst pattern (such as 300) within the first servo track (such as 120) and the position reading from the second servo track from a servo burst pattern (such as 300) within the second servo track (such as 120). The controller can also be viewed as being operable to eliminate a static track shape error component from the difference between the position readings of the first and second servo tracks (such as 120). Furthermore, the apparatus can be viewed as having the first servo track (such as 120) and the second servo track (such as 120) as being written by a servo-writing machine. Finally, the apparatus can be viewed as having first servo track (such as 120) and the second servo track (such as 120) as being written using self-propagating servo writing.

As another alternative, an embodiment of the present invention can be viewed as an apparatus for correcting a track shape error within a servo track (such as 120) located on a data storage media (such as 108) within a data storage device (such as 100), comprising a controller for applying a track shape error correction factor (such as 203) to the servo track (such as 120) and means for computing the track shape error correction factor (such as 203) derived from positional information simultaneously gathered from the servo track (such as 120) and an adjacent servo track (such as 120). The track shape error correction factor (such as 203) may be viewed as a zero acceleration correction factor (such as 203). The track shape error correction factor (such as 203) can be viewed as being saved within a servo sector located within the servo track (such as 120). Furthermore, the track shape error correction factor (such as 203) can be viewed as only being saved in the servo sector of the servo track (such as 120) containing data.

Additionally in an embodiment of the present invention, the positional information from the servo track (such as 120) can be viewed as being obtained from a servo burst pattern (such as 300) within the servo track (such as 120) and the positional information from the adjacent servo track (such as 120) is obtained from a servo burst pattern (such as 300) within the adjacent servo track (such as 120). The track shape error correction factor (such as 203) computed by the apparatus can be viewed as being computed using a difference between the positional information gathered from the servo track (such as 120) and the positional information gathered from the adjacent servo track (such as 120). The apparatus can be viewed as eliminated a static track shape error component from the positional information gathered from the servo track (such as 120) and the positional information gathered from the adjacent servo track (such as 120). Furthermore, in an embodiment of the present invention, one of the servo track (such as 120) and the adjacent servo track (such as 120) of the apparatus can be viewed as being written on the data storage media (such as 108) using a servo-writing machine. Likewise, in an embodiment of the present invention, one of the servo track (such as 120) and the adjacent servo track (such as 120) of the apparatus can be viewed as being written on the data storage media (such as 108) using self-propagating servo writing. Finally, in an embodiment of the present invention, the positional information from the servo track (such as 120) and the positional information of the adjacent servo track (such as 120) can be viewed as being gathered in one revolution of the data storage media (such as 108).

Numerous other changes may be made which will readily suggest themselves to those skilled in the art and which are encompassed in the spirit of the invention disclosed and as defined in the appended claims.

What is claimed is:

1. A method comprising steps of:
   (a) aligning a read/write head between a first servo track and a second servo track;
   (b) receiving, within a one-revolution interval, a first read/write head position reading from a servo burst pattern of the first servo track and a second read/write head position reading from a servo burst pattern of the second servo track; and
   (c) deriving a value indicative of an offset between the first servo track and the second servo track based on the first and second position readings.

2. The method of claim 1 further comprising a step (d) of applying a correction factor to reduce the offset between the first and second servo tracks.

3. The method of claim 1 wherein the first servo track is adjacent to the second servo track.

4. The method of claim 1 wherein receiving step (b) is completed while the head is over a single servo wedge on the data storage media.

5. The method of claim 1 wherein the deriving step (c) comprises steps of:
   (c1) calculating a difference between the first and second position readings; and
   (c2) eliminating a static track shape error component from the difference between the first and second position readings.

6. A method for correcting a track shape error in a data storage device having a read/write head and a rotating data storage media, wherein the read/write head has a read element and a write element, and the data storage media has a servo track with a servo burst pattern, and the read/write head traverses a surface of the data storage media, the method comprising steps of:
   a) setting k equal to 0, wherein k represents a servo track number;
   b) applying a track shape error correction factor to a servo track k;
   c) aligning the read element between the servo track k and a servo track k+1;
   d) using positional information from a servo burst pattern of the servo track k to maintain the read element between the servo track k and the servo track k+1;
   e) gathering, simultaneously, a read/write head position reading from the servo burst pattern of the servo track k and a read/write head position reading from a servo burst pattern of the servo track k+1;
   f) determining a dynamic track spacing error between the servo track k and the servo track k+1;
   g) determining a track shape error correction factor for the servo track k+1; and,
   h) recording the track shape error correction factor for the servo track k+1.

7. The method of claim 6 further comprising steps:
   i) adding 1 to k;
   j) repeating aligning step (c) through adding step (i) until a track shape error correction factor is associated with a desired number of servo tracks.

8. The method of claim 7 wherein track shape error correction factors are only determined and saved for a servo track containing user data.

9. The method of claim 6 wherein gathering step (e) is completed in a single revolution of the data storage media.

10. The method of claim 6 wherein the track shape error correction factors are zero acceleration (ZAP) correction factors.

11. The method of claim 6 wherein determining step (f) further comprises step:
    (f) (i) eliminating a static track shape error component from the read/write head position reading of track k and the read/write head position reading of track k+1 obtained in gathering step (e).

12. The method of claim 6 wherein the track shape error correction factor is used to eliminate a track shape error during normal operation of the data storage device.

13. The method of claim 6 wherein the track shape error correction factor for the servo track k+1 is saved within a servo sector of the servo track k+1.

14. The method of claim 6 wherein one of the servo track k and the servo track k+1 is written using a servo writing machine.

15. The method of claim 6 wherein one of the servo track k and the servo track k+1 is written using self-propagating servo writing.

16. The method of claim 6 wherein the track shape error correction factor applied to track k in applying step (b) is determined using conventional ZAP correction techniques.

17. The method of claim 6 wherein determining step (g) further comprises steps of:
    (g1) computing a recursive estimate of the dynamic track spacing error;
    (g2) computing a first estimate of the shape of track k+1;

(g3) computing a course estimate of the shape of track k+1;

(g4) computing a final estimate of the shape of track k+1; and (g5) using the final estimate of the shape of track k+1 as the track shape error correction factor.

18. An apparatus comprising:

a controller for applying a track shape error correction factor to a servo track; and means for computing a track shape error correction factor derived from positional information gathered from the servo track and from an adjacent servo track.

19. The apparatus of claim 18 wherein the track shape error correction factor is a zero acceleration correction factor.

20. The apparatus of claim 18 wherein the track shape error correction factor is saved within a servo sector located within the servo track.

21. The apparatus of claim 20 wherein the track shape error correction factor is only saved in the servo sector of the servo track containing data.

22. The apparatus of claim 18 wherein the positional information from the servo track is obtained from a servo burst pattern within the servo track and the positional information from the adjacent servo track is obtained from a servo burst pattern within the adjacent servo track.

23. The apparatus of claim 18 wherein the track shape error correction factor is computed using a difference between the positional information gathered from the servo track and the positional information gathered from the adjacent servo track.

24. The apparatus of claim 18 wherein a static track shape error component is eliminated from the positional information gathered from the servo track and the positional information gathered from the adjacent servo track.

25. The apparatus of claim 18 wherein one of the servo track and the adjacent servo track is written on the data storage media using a servo-writing machine.

26. The apparatus of claim 18 wherein one of the servo track and the adjacent servo track is written on the data storage media using self-propagating servo writing.

27. The apparatus of claim 18 wherein the positional information from the servo track and the positional information of the adjacent servo track is gathered in one revolution of the data storage media.

* * * * *